(12) United States Patent
Fukada et al.

(10) Patent No.: US 12,448,983 B2
(45) Date of Patent: Oct. 21, 2025

(54) BLOWER

(71) Applicant: DENSO CORPORATION, Kariya (JP)

(72) Inventors: Mari Fukada, Kariya (JP); Jun Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/914,807

(22) Filed: Oct. 14, 2024

(65) Prior Publication Data
US 2025/0035126 A1    Jan. 30, 2025

Related U.S. Application Data

(63) Continuation of application No. PCT/JP2023/014272, filed on Apr. 6, 2023.

(30) Foreign Application Priority Data

Apr. 21, 2022    (JP) .................................. 2022-070248

(51) Int. Cl.
*F04D 29/28*    (2006.01)
*F04D 1/00*    (2006.01)
(Continued)

(52) U.S. Cl.
CPC .............. *F04D 29/281* (2013.01); *F04D 1/00* (2013.01); *F04D 29/282* (2013.01); *F04D 29/30* (2013.01);
(Continued)

(58) Field of Classification Search
CPC ........ F04D 29/281; F04D 1/00; F04D 29/282; F04D 29/30; F04D 29/66; F05D 2240/306
See application file for complete search history.

(56) References Cited

U.S. PATENT DOCUMENTS 6,042,335 A * 3/2000 Amr .................... F04D 29/4213
415/173.1
6,592,329 B1 * 7/2003 Hirose .................. F04D 29/281
416/203
(Continued)

FOREIGN PATENT DOCUMENTS

JP    2012193740 A    10/2012
JP    2013119816 A *  6/2013
(Continued)

OTHER PUBLICATIONS

Ishii et al (WO 2017090347) machine translation (Year: 2017).*

*Primary Examiner* — Brian Christopher Delrue
(74) *Attorney, Agent, or Firm* — Harness, Dickey & Pierce, P.L.C.

(57) ABSTRACT

A blower includes a shaft and a centrifugal fan. The centrifugal fan includes a plurality of blades, a shroud and a main plate. Each of the plurality of blades has a leading edge and a trailing edge. At each blade, a negative pressure surface of an air inlet section of the blade, which is closer to the leading edge than the trailing edge, has a projection that projects toward a positive pressure surface of an adjacent one of the plurality of blades. At least a portion of the positive pressure surface of the air inlet section is inclined toward a forward side in a rotational direction of the centrifugal fan to progressively extend toward the forward side in the rotational direction as the portion of the positive pressure surface of the air inlet section extends toward the main plate.

7 Claims, 16 Drawing Sheets

(51) Int. Cl.
*F04D 29/30* (2006.01)
*F04D 29/66* (2006.01)

(52) U.S. Cl.
CPC ........ *F04D 29/66* (2013.01); *F05D 2240/305* (2013.01); *F05D 2240/306* (2013.01)

(56) References Cited

U.S. PATENT DOCUMENTS

| | | | |
|---|---|---|---|
| 9,394,920 B2* | 7/2016 | Yamasaki | F04D 29/281 |
| 9,829,004 B2* | 11/2017 | Ikeda | F04D 29/384 |
| 12,025,148 B2* | 7/2024 | Ishii | F04D 29/30 |
| 2004/0213661 A1* | 10/2004 | Sekularac | F04D 29/681 |
| | | | 415/58.4 |
| 2012/0045338 A1* | 2/2012 | Tadokoro | F04D 29/30 |
| | | | 416/196 R |
| 2012/0063899 A1* | 3/2012 | Ikeda | F04D 29/245 |
| | | | 416/185 |
| 2015/0030454 A1* | 1/2015 | Ikeda | F04D 29/667 |
| | | | 416/186 R |
| 2015/0226227 A1* | 8/2015 | Ikeda | F04D 29/281 |
| | | | 416/182 |
| 2018/0328376 A1 | 11/2018 | Ishii et al. | |
| 2018/0328379 A1* | 11/2018 | Harris | F02B 37/16 |
| 2019/0242396 A1* | 8/2019 | Ishii | F04D 29/28 |
| 2021/0239126 A1 | 8/2021 | Ishii et al. | |
| 2021/0372431 A1* | 12/2021 | Sato | F04D 29/281 |
| 2023/0141673 A1* | 5/2023 | Ishii | F04D 29/384 |
| | | | 416/179 |
| 2024/0410375 A1* | 12/2024 | Inoue | F04D 29/30 |

FOREIGN PATENT DOCUMENTS

| | | | | |
|---|---|---|---|---|
| JP | 5274278 B2 * | 8/2013 | | |
| JP | 6593538 B2 | 10/2019 | | |
| WO | WO-2009139422 A1 * | 11/2009 | ............ | F04D 29/281 |
| WO | WO-2015147460 A1 * | 10/2015 | ............ | F04D 29/281 |
| WO | WO-2017090347 A1 * | 6/2017 | ............ | F04D 25/06 |

* cited by examiner

BLOWER

CROSS REFERENCE TO RELATED APPLICATIONS

This application is a continuation application of International Patent Application No. PCT/JP2023/014272 filed on Apr. 6, 2023, which designated the U.S. and claims the benefit of priority from Japanese Patent Application No. 2022-070248 filed on Apr. 21, 2022. The entire disclosures of all of the above applications are incorporated herein by reference.

TECHNICAL FIELD

The present disclosure relates to a blower.

BACKGROUND

In a previously proposed blower, an adjacent portion of a leading edge of each of a plurality of blades adjacent to a shroud ring (also simply referred to as a shroud) is inclined toward a forward side in a rotational direction to a greater extent compared to an adjacent portion of the leading edge of the blade adjacent to a main plate to limit separation of airflow near the shroud ring.

At the previously proposed blower, in the vicinity of the leading edge of each of the blades, a flow velocity of the airflow at a negative pressure surface side of the blade tends to be higher than a flow velocity of the airflow at a positive pressure surface side of the blade. This flow velocity distribution is undesirable because it possibly causes an increase in a pressure loss and an increase in a noise level.

SUMMARY

This section provides a general summary of the disclosure, and is not a comprehensive disclosure of its full scope or all of its features.

According to one aspect of the present disclosure, there is provided a blower including a shaft and a centrifugal fan coupled to the shaft. The centrifugal fan is coupled to the shaft. The centrifugal fan includes a plurality of blades, a shroud and a main plate. The plurality of blades are arranged around a central axis of the shaft. The shroud is coupled to a first blade end part of each of the plurality of blades that faces one side in an axial direction of the shaft. The shroud has an air suction hole that is configured to suction air. The main plate is coupled to a second blade end part of each of the plurality of blades that faces another side opposite to the one side in the axial direction. Each of the plurality of blades has a leading edge, which forms an inner periphery of the blade, and a trailing edge, which forms an outer periphery of the blade. At each of the plurality of blades each having a positive pressure surface and a negative pressure surface, the negative pressure surface of an air inlet section of the blade, which is closer to the leading edge than the trailing edge, has a projection that projects toward the positive pressure surface of an adjacent one of the plurality of blades. At each of the plurality of blades, at least a portion of the positive pressure surface of the air inlet section is inclined toward a forward side in a rotational direction of the centrifugal fan to progressively extend toward the forward side in the rotational direction as the portion of the positive pressure surface of the air inlet section extends toward the main plate.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
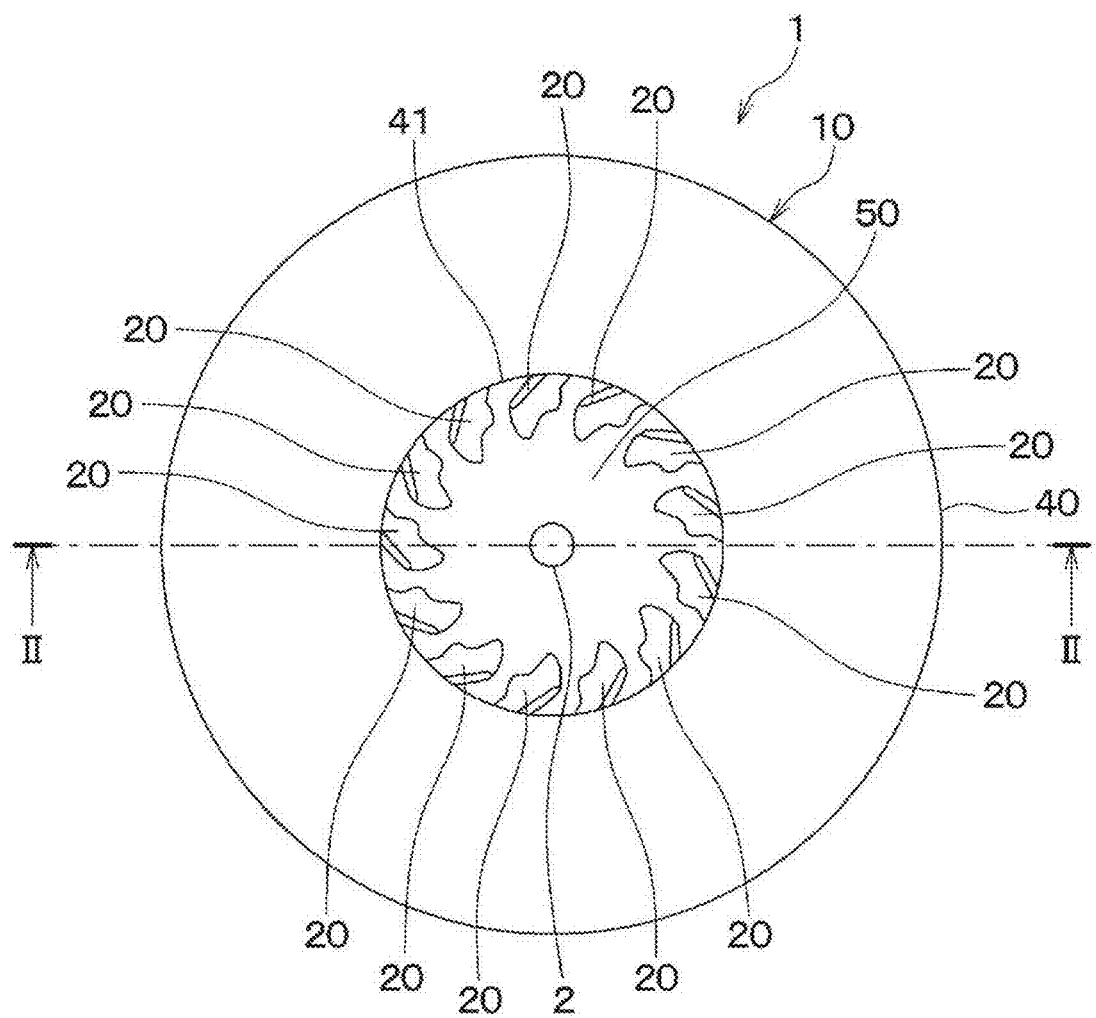
FIG. 1 is a schematic plan view of a blower according to an embodiment.

In a previously proposed blower, an adjacent portion of a leading edge of each of a plurality of blades adjacent to a shroud ring is inclined toward a forward side in a rotational direction to a greater extent compared to an adjacent portion of the leading edge of the blade adjacent to a main plate to limit separation of airflow near the shroud ring.

At the previously proposed blower, in the vicinity of the leading edge of each of the blades, a flow velocity of the airflow at a negative pressure surface side of the blade tends to be higher than a flow velocity of the airflow at a positive pressure surface side of the blade. This flow velocity distribution is undesirable because it possibly causes an increase in a pressure loss and an increase in a noise level. The above finding is made thorough the diligent study of the inventors of the present application.

According to one aspect of the present disclosure, there is provided a blower including:
- a shaft; and
- a centrifugal fan which is coupled to the shaft, wherein: the centrifugal fan includes:
  - a plurality of blades which are arranged around a central axis of the shaft;
  - a shroud which is coupled to a first blade end part of each of the plurality of blades that faces one side in an axial direction of the shaft, wherein the shroud has an air suction hole that is configured to suction air; and
  - a main plate which is coupled to a second blade end part of each of the plurality of blades that faces another side opposite to the one side in the axial direction;
- each of the plurality of blades has a leading edge, which forms an inner periphery of the blade, and a trailing edge, which forms an outer periphery of the blade;
- at each of the plurality of blades, a plurality of dividing points, which are sequentially numbered from one of the first blade end part and the second blade end part, are set along the leading edge to divide the leading edge by a predetermined number and thereby form a plurality of segments which have equal lengths, respectively, along the leading edge; a plurality of dividing points, which are sequentially numbered from the one of the first blade end part and the second blade end part, are set along the trailing edge to divide the trailing edge by the predetermined number and thereby form a plurality of segments which have equal lengths, respectively, along the trailing edge; at least one intermediate part is positioned to uniformly divide the blade between the leading edge and the trailing edge into a plurality of sections; a plurality of dividing points, which are sequentially numbered from the one of the first blade end part and the second blade end part, are set along the at least one intermediate part to divide the at least one intermediate part by the predetermined number and thereby form a plurality of segments which have equal lengths, respectively, along the at least one intermediate part; a plurality of virtual flow lines are set such that each of the plurality of virtual flow lines connects a corresponding one of the plurality of dividing points along the leading edge, a corresponding one of the plurality of dividing points along the trailing edge and a corresponding one of the plurality of dividing points along the at least one intermediate part which are identically numbered;
- at each of the plurality of blades each having a positive pressure surface and a negative pressure surface, the negative pressure surface of an air inlet section of the blade, which is closer to the leading edge than the trailing edge along the plurality of virtual flow lines, has a projection that projects toward the positive pressure surface of an adjacent one of the plurality of blades; and
- at each of the plurality of blades, at least a portion of the positive pressure surface of the air inlet section is inclined toward a forward side in a rotational direction of the centrifugal fan to progressively extend toward the forward side in the rotational direction as the portion of the positive pressure surface of the air inlet section extends toward the main plate.

With the configuration discussed above, the projection formed at the negative pressure surface of each blade exerts a force to a part of the airflow, which flows along the negative pressure surface of the blade, in a direction away from the negative pressure surface. Therefore, the airflow is more easily directed toward the positive pressure surface of the adjacent blade. Thus, a difference between a flow velocity of the airflow at the negative pressure surface side of the blade and a flow velocity of the airflow at the positive pressure surface side of the blade can be reduced, and thereby the flow velocity distribution discussed above around the leading edge can be limited.

Here, a vortex may be generated at the positive pressure surface of the blade due to an influence of a centrifugal force caused by a curvature of an inter-blade passage formed between adjacent two of the blades, in balance with a velocity boundary layer generated at the positive pressure surface. This vortex tends to increase when the flow velocity of the airflow is high at the positive pressure surface side, as in the present case.

In view of this point, in the centrifugal fan of the present disclosure, at least the portion of the positive pressure surface of the air inlet section is inclined toward the forward side in the rotational direction to progressively extend toward the forward side in the rotational direction as the portion of the positive pressure surface of the air inlet section extends toward the main plate. Therefore, a force is likely to act in a direction for limiting generation or development of the vortex at the positive pressure surface side of the blade, and thereby it is possible to limit the disadvantages resulting from the vortex at the positive pressure surface side.

Therefore, the blower of the present disclosure can limit the flow velocity distribution discussed above around the leading edge of the blade and limit the disadvantages, such as an increase in the pressure loss and an increase in the noise level, resulting from the flow velocity distribution discussed above.

EMBODIMENT

Figure 2:
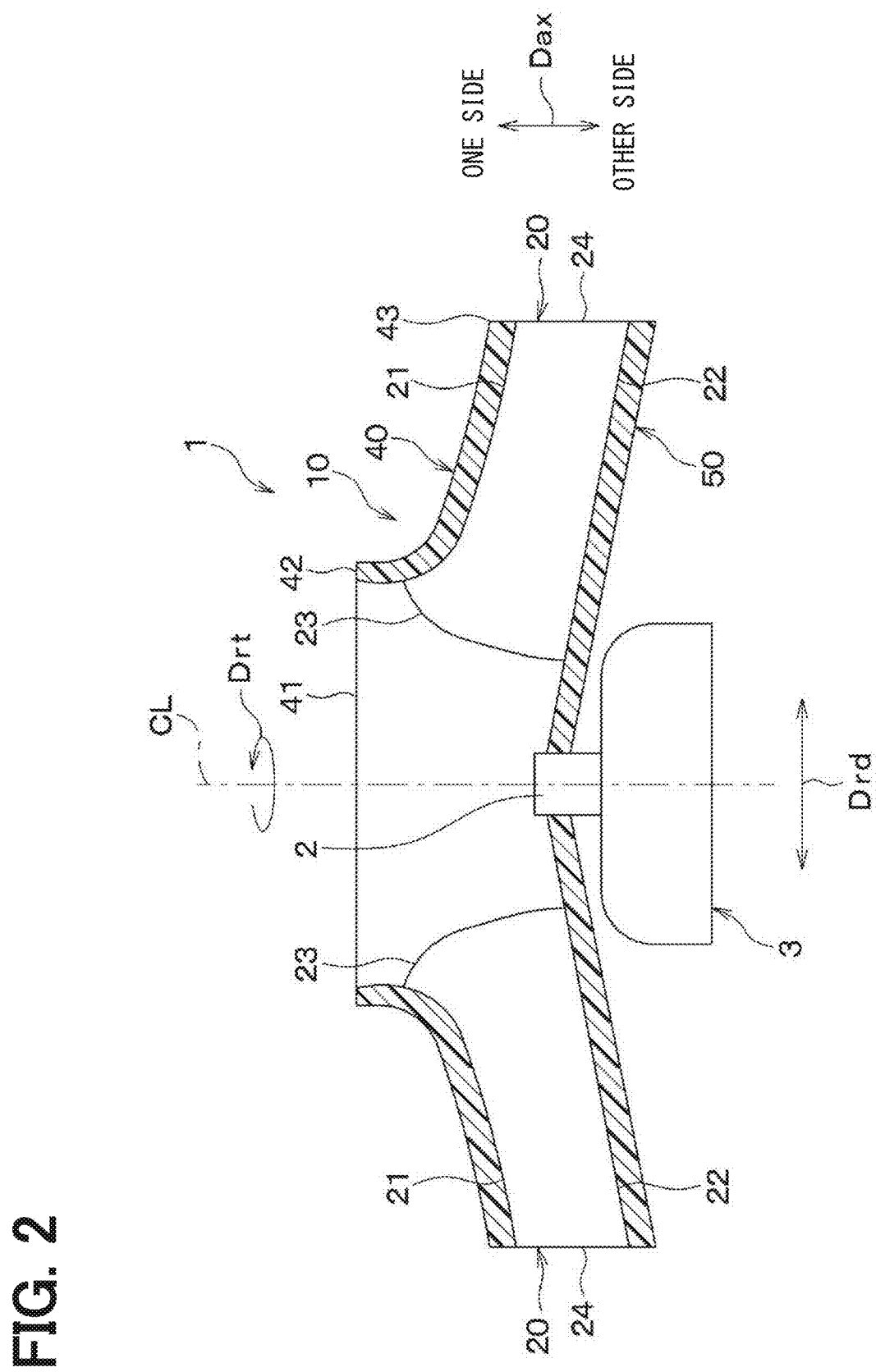
FIG. 2 is a cross-sectional view taken along line II-II in FIG. 1.

Hereinafter, an embodiment of the present disclosure will be described with reference to FIGS. 1 to 19. A blower 1 shown in FIGS. 1 and 2 is applied, for example, to an air conditioning device in a room. The blower 1 includes a casing (not shown), a shaft 2, an electric motor 3 and a centrifugal fan 10.

The casing is a housing of the blower 1. The casing protects the shaft 2, the electric motor 3 and the centrifugal fan 10 from dust and dirt outside of the blower 1. The shaft 2, the electric motor 3 and the centrifugal fan 10 are received in an inside of the casing. The casing has a suction port and a discharge port of air.

The shaft 2 is a rotatable shaft of the blower 1. The shaft 2 is a rod material shaped in a cylindrical form. The shaft 2 is made of a metal material, such as iron, stainless steel, or brass. In the drawings such as FIG. 2, a direction along a central axis CL of the shaft 2 is referred to as an axial direction Dax, and a direction radiating away from the central axis CL of the shaft 2 is referred to as a radial direction Drd, and a rotational direction of the shaft 2 and the centrifugal fan 10 is referred to as a rotational direction Drt.

The electric motor 3 is a drive device of the blower 1. When the electric motor 3 is energized, the electric motor 3 drives and rotates the shaft 2 and the centrifugal fan 10 about the central axis CL of the shaft 2. The electric motor 3 is, for example, an outer rotor brushless DC motor.

The centrifugal fan 10 is an impeller applied to the blower 1. The centrifugal fan 10 is coupled to the shaft 2. When the electric motor 3 is driven in response to the energization, the centrifugal fan 10 is rotated integrally with the shaft 2 about the central axis CL of the shaft 2.

The centrifugal fan 10 includes: a plurality of blades 20 which are arranged around the central axis CL of the shaft 2; a shroud 40 which is placed on one side of each of the blades 20 in the axial direction Dax and is coupled to each of the blades 20; and a main plate 50 which is placed on the other side of each of the blades 20 in the axial direction Dax and is coupled to each of the blades 20.

The blades 20 are spaced from each other and are arranged in the rotational direction Drt of the shaft 2. Each of the blades 20 has an identical shape. Each of the blades 20 has: a first blade end part 21, which faces the one side in the axial direction Dax and forms one end of the blade 20; and a second blade end part 22, which faces the other side in the axial direction Dax and forms the other end of the blade 20.

Each of the blades 20 has a leading edge 23, which forms an inner periphery of the blade 20, and a trailing edge 24, which forms an outer periphery of the blade 20. The leading edge 23 is shaped such that a distance between the leading edge 23 and the central axis CL is reduced from the one side toward the other side in the axial direction Dax. Specifically, the leading edge 23 is curved such that an angle, which is defined between the leading edge 23 and the central axis CL, is reduced from the one side toward the other side in the axial direction Dax. The trailing edge 24 extends parallel to the central axis CL.

Each of the blades 20 has a positive pressure surface 20A and a negative pressure surface 20B which define a blade shape of the blade 20. The positive pressure surface 20A is a first blade surface which is located on a forward side in the rotational direction Drt. The negative pressure surface 20B is a second blade surface which is located on a rear side in the rotational direction Drt. Furthermore, an inter-blade passage 29, along which the air flows, is formed between each adjacent two of the blades 20.

The shroud 40 is shaped in a circular ring form that expands in the radial direction Drd. The shroud 40 is coupled to the first blade end part 21 of each of the blades 20. An air suction hole 41, through which the air is suctioned, is formed at an inner periphery of the shroud 40.

The shroud 40 has an inner peripheral end portion 42, which forms the inner periphery of the shroud 40, and an outer peripheral end portion 43, which forms an outer periphery of the shroud 40. The inner peripheral end portion 42 of the shroud 40 forms the air suction hole 41. The inner peripheral end portion 42 of the shroud 40 projects toward an upper side in the axial direction Dax to ease the flow of the air into the air suction hole 41. Furthermore, the outer peripheral end portion 43 of the shroud 40 extends in a direction that intersects the axial direction Dax.

The main plate 50 is shaped in a circular disk form that expands in the radial direction Drd. An inner periphery of the main plate 50 is coupled to the shaft 2 through a cap (not shown). The main plate 50 is coupled to the second blade end part 22 of each of the blades 20. The main plate 50 extends in a direction that intersects the axial direction Dax.

The centrifugal fan 10 of the present embodiment is formed as a closed fan in which two opposite sides, which are opposite to each other in the axial direction Dax, are covered by the shroud 40 and the main plate 50, respectively. The centrifugal fan 10 may be formed as an integral structure, in which the blades 20, the shroud 40 and the main plate 50 are formed integrally in one-piece by, for example, injection molding, or the centrifugal fan 10 may be formed such that the blades 20, the shroud 40 and the main plate 50 are separately formed and are joined together by, for example, a bonding agent.

Figure 3:
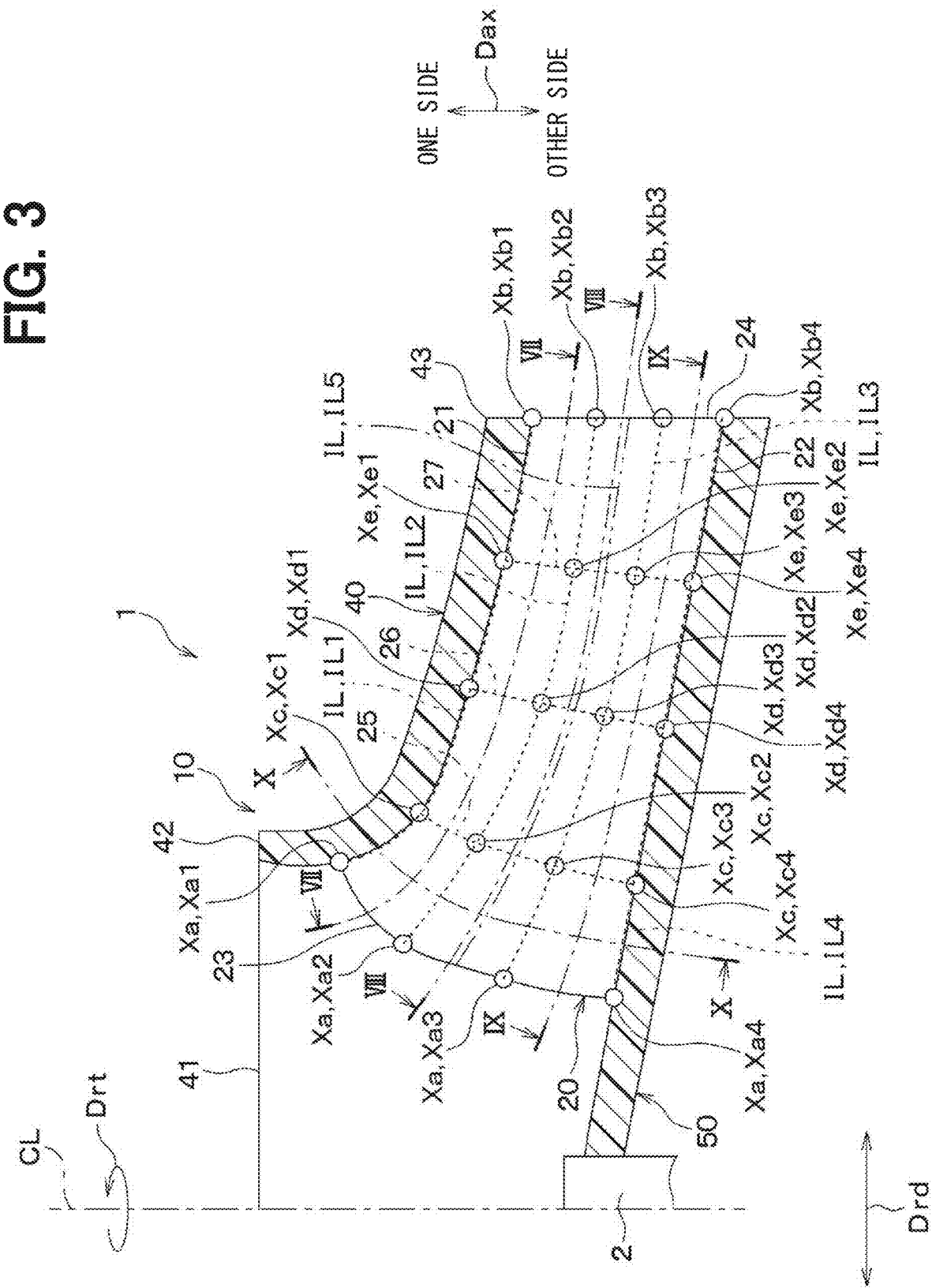
FIG. 3 is an explanatory diagram for explaining virtual flow lines.

The centrifugal fan 10 of the present embodiment is a turbofan, in which the trailing edge 24 side of the blade 20 is inclined in the opposite direction that is opposite to the rotational direction Drt of the shaft 2. When the centrifugal fan 10 is rotated about the central axis CL of the shaft 2, the centrifugal fan 10 suctions the air from the one side in the axial direction Dax. The centrifugal fan 10 discharges the air, which is suctioned from the one side in the axial direction Dax, in a direction (i.e., the radial direction Drd) away from the central axis CL of the shaft 2. A type of the centrifugal fan 10 may include a diagonal flow fan that suctions the air from the one side in the axial direction Dax and discharges the suctioned air in a direction that is inclined relative to the central axis CL of the shaft 2. In the centrifugal fan 10, for example, as shown in FIG. 3, the air flows along virtual flow lines IL1-IL4. Hereinafter, the virtual flow lines IL1-IL4 will be described with reference to FIG. 3.

Each of the virtual flow lines IL1-IL4 is a line that connects, in a predetermined order, a corresponding one of a plurality of dividing points Xa set along the leading edge 23, a corresponding one of a plurality of dividing points Xb set along the trailing edge 24 and a corresponding one of a plurality of dividing points Xc, Xd, Xe set along a corresponding one of a plurality of intermediate parts 25, 26, 27.

The dividing points Xa are set along the leading edge 23 to divide the leading edge 23 by a predetermined number and thereby form a plurality of segments which have equal lengths, respectively, along the leading edge 23. FIG. 3 shows four dividing points Xa1 to Xa4 which are set to divide the leading edge 23 by three. Here, it should be noted the leading edge 23 may be divided by a number that is different from the number (the number of divisions) shown in FIG. 3.

The dividing points Xb are set along the trailing edge 24 to divide the trailing edge 24 by the predetermined number and thereby form a plurality of segments which have equal lengths, respectively, along the trailing edge 24. FIG. 3 shows four dividing points Xb1 to Xb4 which are set to divide the trailing edge 24 by three. Here, it should be noted that the trailing edge 24 may be divided by a number that is different from the number shown in FIG. 3. It should be also noted that the number of divisions of the trailing edge 24 must be the same as the number of divisions of the leading edge 23.

The intermediate parts 25, 26, 27 are positioned to uniformly divide the blade 20 between the leading edge 23 and the trailing edge 24 into a plurality of sections. The dividing points Xc are set along the intermediate part 25 to divide the intermediate part 25 by the predetermined number and thereby form a plurality of segments which have equal lengths, respectively, along the intermediate part 25. The dividing points Xd are set along the intermediate part 26 to divide the intermediate part 26 by the predetermined number and thereby form a plurality of segments which have equal lengths, respectively, along the intermediate part 26. The dividing points Xe are set along the intermediate part 27 to divide the intermediate part 27 by the predetermined number and thereby form a plurality of segments which have equal lengths, respectively, along the intermediate part 27. FIG. 3 shows four dividing points (more specifically three sets of four dividing points) Xc1 to Xc4, Xd1 to Xd4, Xe1 to Xe4, and each set of four dividing points Xc1 to Xc4, Xd1 to Xd4, Xe1 to Xe4 are set to divide the corresponding one of the intermediate parts 25, 26, 27 by three. Here, it should be noted that each of the intermediate parts 25, 26, 27 may be divided by a number that is different from the number (the number of divisions) shown in FIG. 3. It should be also noted that the number of divisions of each of the intermediate parts 25, 26, 27 must be the same as the number of divisions of the leading edge 23 and the number of divisions of the trailing edge 24.

In the present embodiment, the virtual flow lines IL1-IL4 are set such that each of the virtual flow lines IL1-IL4 connects a corresponding one of the plurality of dividing points Xa along the leading edge 23, a corresponding one of the plurality of dividing points Xb along the trailing edge 24 and a corresponding one of the plurality of dividing points Xc, Xd, Xe along each of intermediate parts 25, 26, 27 which are identically numbered when the dividing points Xa, Xb, Xc, Xd, Xe are sequentially numbered from the first blade end part 21. Alternatively, each of the virtual flow lines IL1-IL4 may be set such that each of the virtual flow lines IL1-IL4 connects a corresponding one of the plurality of dividing points Xa along the leading edge 23, a corresponding one of the plurality of dividing points Xb along the trailing edge 24 and a corresponding one of the plurality of dividing points Xc, Xd, Xe along each of the intermediate parts 25, 26, 27 which are identically numbered when the dividing points Xa, Xb, Xc, Xd, Xe are sequentially numbered from the second blade end part 22.

Figure 4:
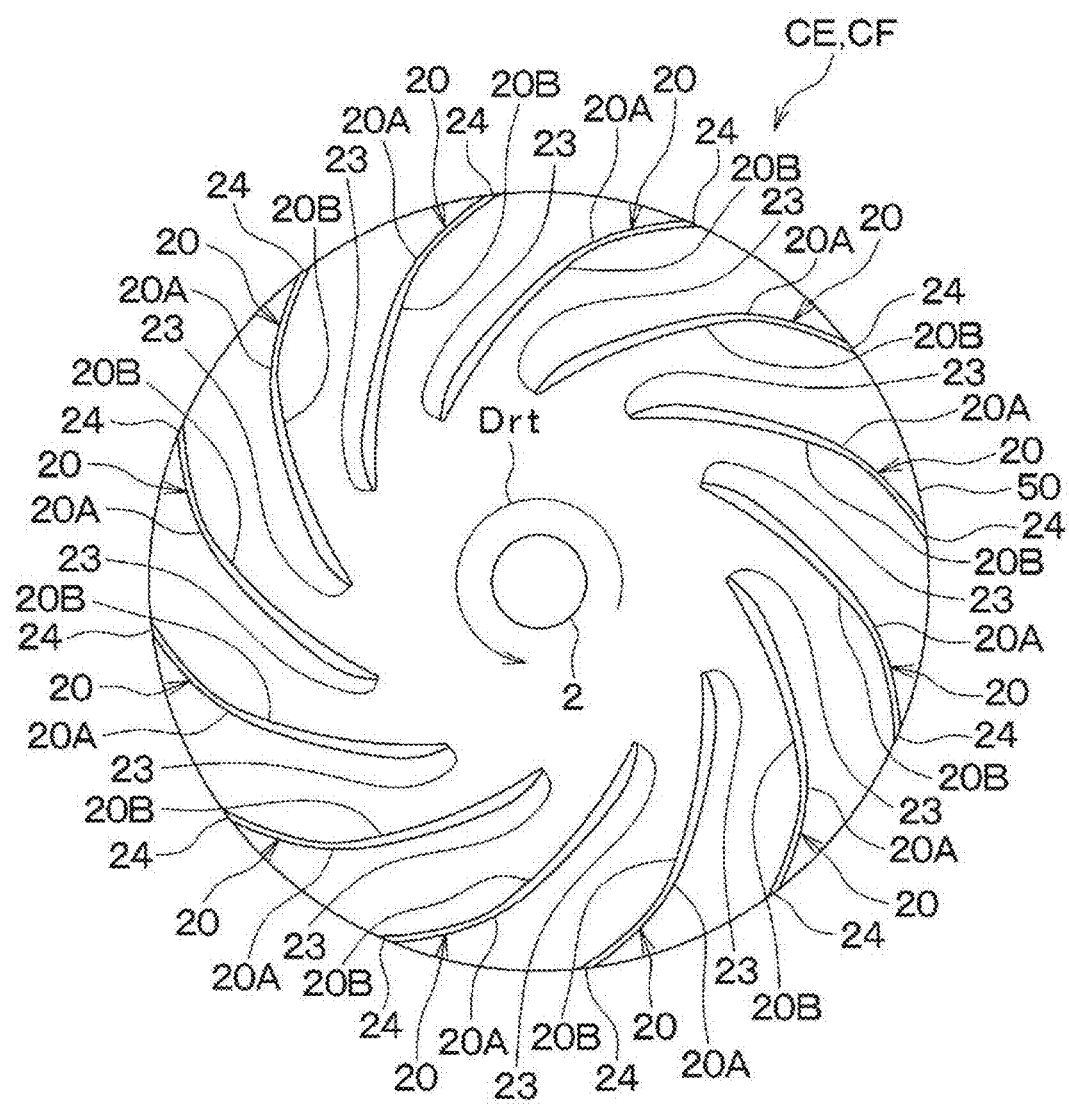
FIG. 4 is an explanatory diagram for explaining a blade shape of a centrifugal fan of a blower of a comparative example.

FIG. 4 is an explanatory diagram for explaining a blade shape of a centrifugal fan CF of a blower CE of a comparative example. FIG. 4 shows a plan view of the centrifugal fan CF in a state where the shroud 40 is removed. In FIG. 4, the corresponding parts of the centrifugal fan CF of the comparative example, which correspond to the parts of the centrifugal fan 10 of the present embodiment, are indicated by the same reference signs as those of the present embodiment.

Figure 5:
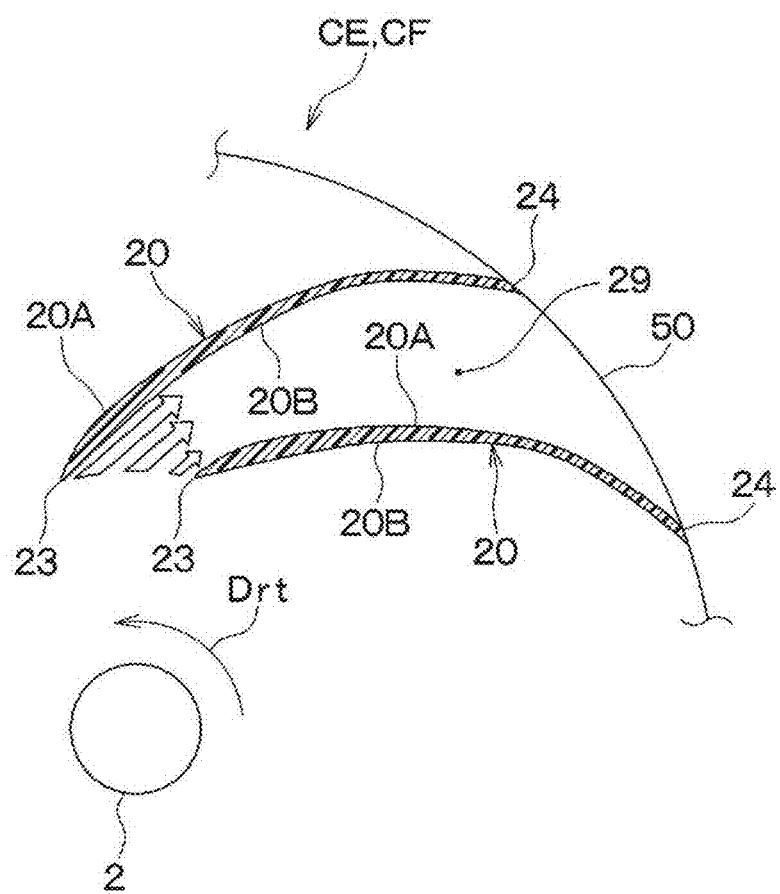
FIG. 5 is an explanatory diagram for explaining a flow velocity distribution around a leading edge of the centrifugal fan of the blower of the comparative example.

As shown in FIG. 4, at each of the blades 20 of the centrifugal fan CF, the positive pressure surface 20A and the negative pressure surface 20B are both curved. When the centrifugal fan CF is rotated about the central axis CL of the shaft 2, the air flows through each inter-blade passage 29 formed between corresponding adjacent two of the blades 20. At this time, as shown in FIG. 5, in the vicinity of the leading edges 23 of each adjacent two of the blades 20, a flow velocity of the airflow along the negative pressure surface 20B of one of these adjacent blades 20 tends to be higher than a flow velocity of the airflow along the positive pressure surface 20A of the other one of the adjacent blades 20. This flow velocity distribution is undesirable because it possibly causes an increase in a pressure loss and an increase in a noise level.

Figure 6:
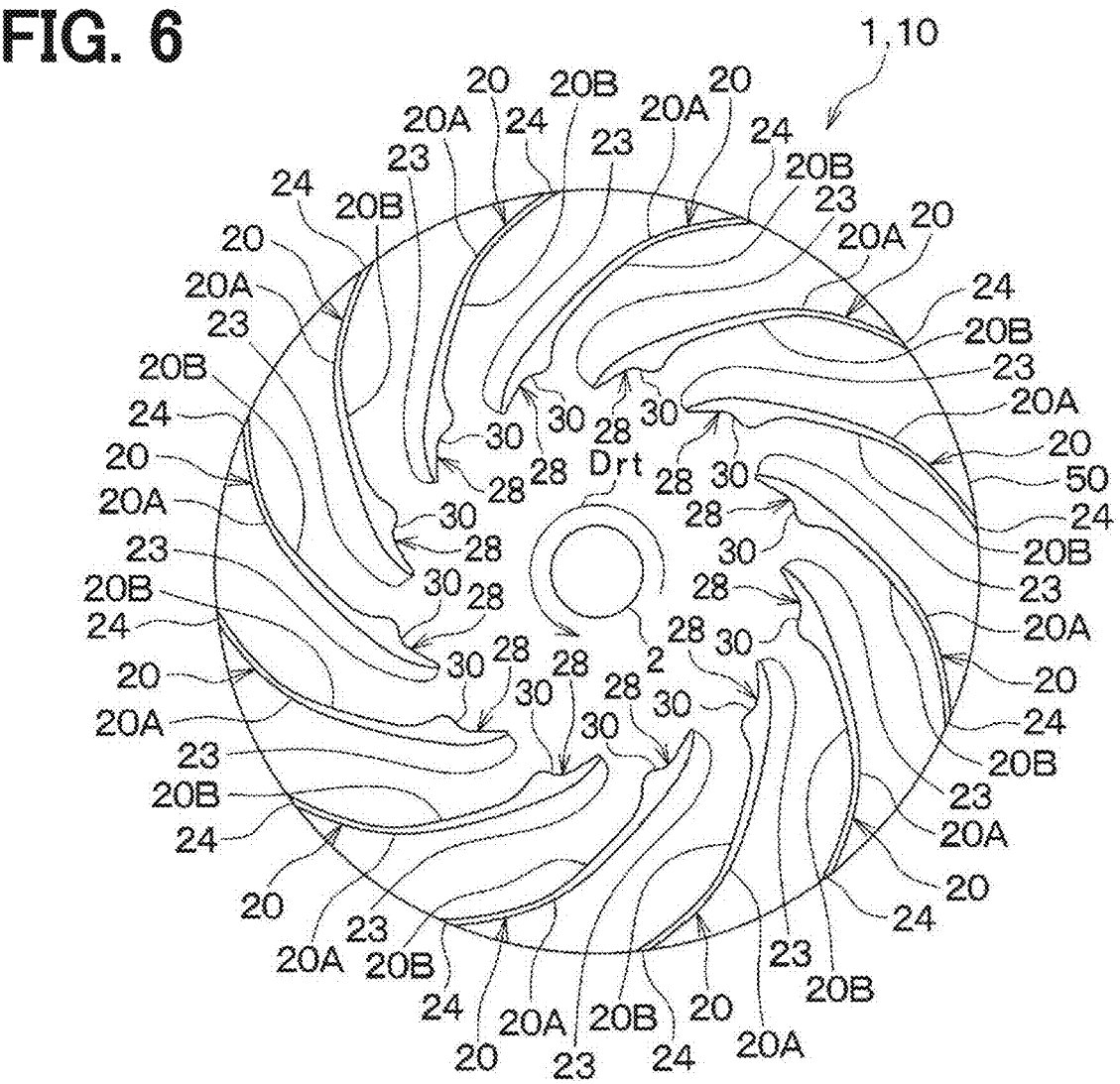
FIG. 6 is an explanatory diagram for explaining a blade shape of a centrifugal fan of the blower of the embodiment.

In view of the above point, in the centrifugal fan 10 of the present embodiment, as shown in FIG. 6, at each of the blades 20, the negative pressure surface 20B of an air inlet section 28, which is adjacent to the leading edge 23, has a projection 30 that projects toward the positive pressure surface 20A of an adjacent one of the blades 20.

The air inlet section 28 is defined as a section of the blade 20 which is closer to the leading edge 23 than the trailing edge 24 along the virtual flow lines IL. Specifically, the air inlet section 28 is the section of the blade 20 which is closer to the central axis CL than the intermediate part 26 which is centered among the intermediate parts 25, 26, 27.

Figure 7:
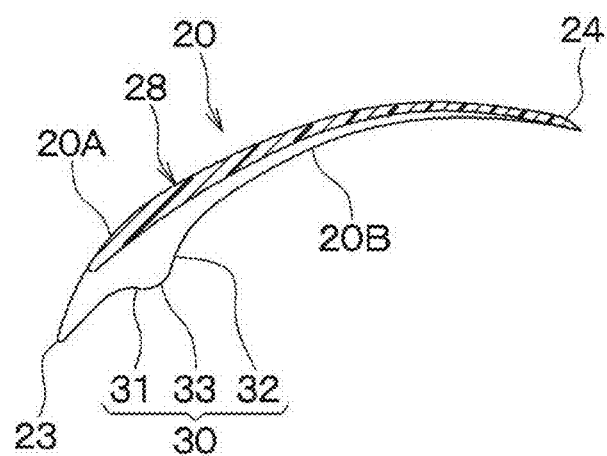
FIG. 7 is a cross-sectional view taken along line VII-VII in FIG. 3.
Figure 8:
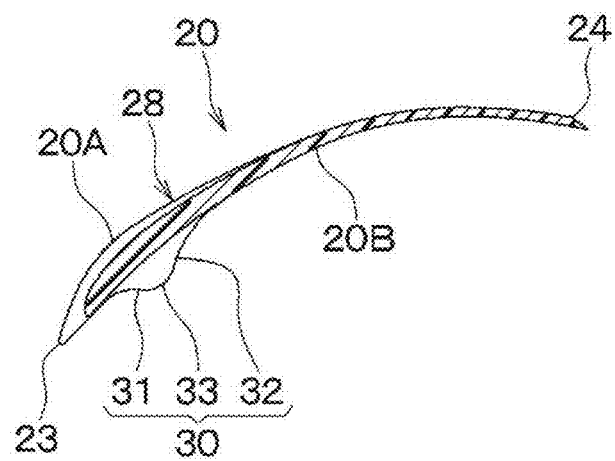
FIG. 8 is a cross-sectional view taken along line VIII-VIII in FIG. 3.
Figure 9:
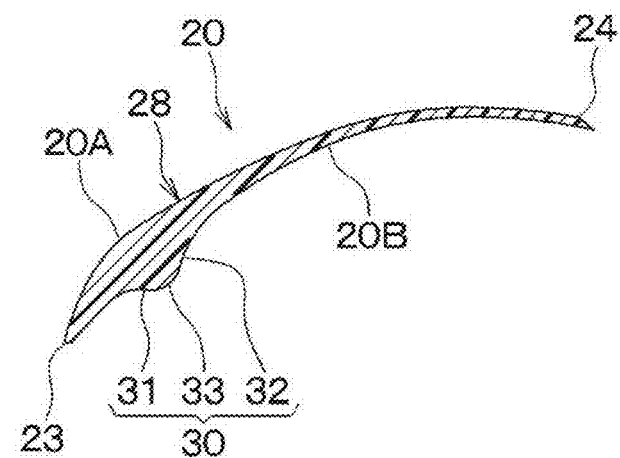
FIG. 9 is a cross-sectional view taken along line IX-IX in FIG. 3.

The projection 30 deflects a direction of the airflow, which flows along the negative pressure surface 20B of the blade 20, to a direction toward the positive pressure surface 20A of the adjacent blade 20. As shown in FIGS. 7, 8 and 9, the projection 30 is formed at the air inlet section 28 at a location that is on a downstream side of the leading edge 23 in the flow direction of the airflow. The projection 30 has a first portion 31 and a second portion 32. The first portion 31 is closer to the leading edge 23 than the second portion 32 and is located on the upstream side of the second portion 32 in the flow direction of the airflow. The first portion 31 is inclined relative to the negative pressure surface 20B such that the first portion 31 progressively extends toward the positive pressure surface 20A of the adjacent blade 20 as the first portion 31 extends in the flow direction of the airflow. The second portion 32 is further from the leading edge 23 than the first portion 31 and is located on the downstream side of the first portion 31. The second portion 32 is inclined relative to the negative pressure surface 20B such that the second portion 32 progressively extends away from the positive pressure surface 20A of the adjacent blade 20 as the second portion 32 extends in the flow direction of the airflow. The projection 30 has a curved surface at a connection of the projection 30 to the negative pressure surface 20B so that no steps or corners are formed at the connection between the negative pressure surface 20B and the first portion 31 and the connection between the second portion 32 and the negative pressure surface 20B.

At the blade 20 formed in the above-described manner, an area, at which the first portion 31 of the projection 30 and the negative pressure surface 20B adjacent to the leading edge 23 intersect with each other, is concavely shaped, and thereby the direction of the airflow, which flows along the negative pressure surface 20B, is deflected to the direction toward the positive pressure surface 20A of the adjacent blade 20.

In order to appropriately deflect the direction of the airflow, which flows along the negative pressure surface 20B, to the direction toward the positive pressure surface 20A of the adjacent blade 20, it is desirable that a plate thickness of a portion of the blade 20 having the projection 30 is at least 1.5 times larger than a plate thickness of another portion of the blade 20 at a smallest inner diameter location of the positive pressure surface 20A. In the present embodiment, the plate thickness of the blade 20 is defined as a length of a line segment, which connects between: an intersection between the positive pressure surface 20A and a virtual circle centered on the central axis CL and having a predetermined radius; and an intersection between the negative pressure surface 20B and the virtual circle described above.

The projection 30 is formed in a section of the negative pressure surface 20B which is from the virtual flow line IL2 to the virtual flow line IL4. Specifically, as shown in FIGS. 7 and 8, the projection 30 is not formed around the first blade end part 21, which faces the one side in the axial direction Dax, at the air inlet section 28. As shown FIG. 9, the projection 30 is formed around the second blade end part 22, which faces the other side in the axial direction Dax, at the air inlet section 28.

Here, a virtual line, which is equidistant from each of two opposite outermost virtual flow lines among the plurality of virtual flow lines IL1-IL4 opposite to each other in the axial direction Dax, is defined as an intermediate virtual flow line IL5. In this case, a location (i.e., an axial location in the axial direction Dax) of the blade 20, at which the plate thickness of the blade 20 measured in the rotational direction Drt is maximized at the portion of the blade 20 having the projection 30 formed at the negative pressure surface 20B, is closer to the main plate 50 than the intermediate virtual flow line IL5 in the axial direction Dax. For example, the projection 30 is positioned such that an apex 33 of the projection 30, which is between the first portion 31 and the second portion 32, is set at a position that is closer to the main plate 50 than the intermediate virtual flow line IL5.

A projecting height of the projection 30 is smaller than an interval between the adjacent two of the blades 20 at a location where the projection 30 is not formed. The projecting height of the projection 30 is, for example, equal to or smaller than half of the interval between the adjacent two of the blades 20 at the location where the projection 30 is not formed.

At the positive pressure surface 20A of the blade 20, a vortex Vt may be generated due to an influence of a centrifugal force caused by a curvature of the inter-blade passage 29, in balance with a velocity boundary layer generated at the positive pressure surface 20A. This vortex Vt is more pronounced in the structure where the flow velocity of the airflow at the positive pressure surface 20A of the adjacent blade 20 is increased by the projection 30 formed at the negative pressure surface 20B as in the case of the present embodiment.

In view of this point, in the centrifugal fan 10 of the present embodiment, a portion of the positive pressure surface 20A of the air inlet section 28 of each blade 20 is inclined toward the forward side in the rotational direction Drt to progressively extend toward a forward side in the rotational direction Drt as this portion of the positive pressure surface 20A extends toward the main plate 50.

Figure 10:
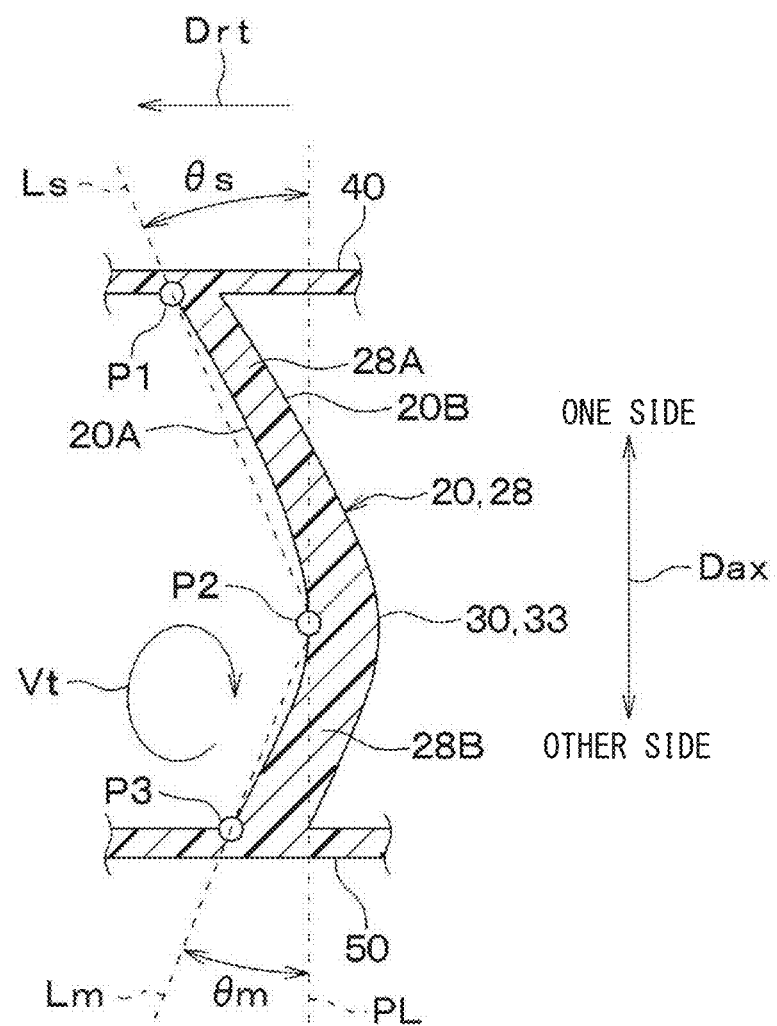
FIG. 10 is a cross-sectional view taken along line X-X in FIG. 3.

Specifically, as shown in FIG. 10, at least a portion of an adjacent side region of the positive pressure surface 20A of the air inlet section 28, which is adjacent to the main plate 50, is inclined toward the forward side in the rotational direction Drt to progressively extend toward the forward side in the rotational direction Drt as the portion of the adjacent side region of the positive pressure surface 20A adjacent to the main plate 50 extends toward the main plate 50. Specifically, a blade lower portion 28B of the positive pressure surface 20A of the air inlet section 28, which is adjacent to the main plate 50, is inclined toward the forward side in the rotational direction Drt to progressively extend toward the forward side in the rotational direction Drt as the blade lower portion 28B extends toward the main plate 50.

Furthermore, at least a portion of an adjacent side region of the positive pressure surface 20A of the air inlet section 28, which is adjacent to the shroud 40, is inclined toward the forward side in the rotational direction Drt to progressively extend toward the forward side in the rotational direction Drt as the portion of the adjacent side region of the positive pressure surface 20A adjacent to the shroud 40 extends toward the shroud 40. Specifically, a blade upper portion 28A of the positive pressure surface 20A of the air inlet section 28, which is adjacent to the shroud 40, is inclined toward the forward side in the rotational direction Drt to progressively extend toward the forward side in the rotational direction Drt as the blade upper portion 28A extends toward the shroud 40.

In the present embodiment, a line, which connects between a most forward point P1 located most forward in the rotational direction Drt and a most rearward point P2 located most rearward in the rotational direction Drt at the positive pressure surface 20A of the blade upper portion 28A of the air inlet section 28, is defined as a shroud side reference line Ls. Furthermore, in the present embodiment, a line, which connects between a most forward point P3 located most forward in the rotational direction Drt and the most rearward point P2 located most rearward in the rotational direction at the positive pressure surface 20A of the blade lower portion 28B of the air inlet section 28, is defined as a main plate side reference line Lm.

The main plate side reference line Lm and the shroud side reference line Ls are both inclined relative to a plane PL that extends parallel to the central axis CL. An angle θm, which is defined between the main plate side reference line Lm and the plane PL extending parallel to the central axis CL, is smaller than an angle θs, which is defined between the shroud side reference line Ls and the plane PL extending parallel to the central axis CL. The most forward point P1 located most forward in the rotational direction Drt at the adjacent side region of the positive pressure surface 20A adjacent to the shroud 40 is located on the forward side in the rotational direction Drt relative to the most forward point P3 located most forward in the rotational direction Drt at the adjacent side region of the positive pressure surface 20A adjacent to the main plate 50. Furthermore, the most rearward point P2 located most rearward in the rotational direction Drt at the positive pressure surface 20A is closer to the main plate 50 than the shroud 40.

At the blade upper portion 28A of the air inlet section 28, the most forward point P1 located most forward in the rotational direction Drt is set such that an inlet angle of the blade 20 at the blade upper portion 28A is smaller than an inlet angle of the blade 20 at the centrifugal fan CF of the comparative example shown in FIG. 4. According to this setting, an angle of incidence of the inflow air relative to the blade 20 at the blade upper portion 28A can be made smaller than an angle of incidence of the inflow air relative to the blade 20 of the centrifugal fan CF of the comparative example. As a result, the separation of the airflow from the blade 20, which occurs near the shroud 40, can be reduced.

Here, the inlet angle is an angle defined between a blade chord line and a tangent line which is tangent to an inscribed circle at the leading edge 23 of the blade 20. The inscribed circle is a virtual circle that touches each of the plurality of blades 20 on the radially inner side of the blades 20 in the radial direction Drd. The leading edge 23 is a part of the blade 20 which contacts the inscribed circle. The blade chord line is a straight line which connects between the leading edge 23 and the trailing edge 24 of the blade 20. Furthermore, the angle of incidence is a difference between an inflow angle of the inflow air at the leading edge 23 of the blade 20 and the inlet angle. The inflow angle is an angle defined between the tangent line, which is tangent to the inscribed circle at the leading edge 23 of the blade 20, and a flow velocity vector of the inflow air at the leading edge 23 of the blade 20.

The blade lower portion 28B of the air inlet section 28 is inclined toward the forward side in the rotational direction with a degree of inclination that is progressively reduced as the blade lower portion 28B of the air inlet section 28 extends away from the main plate 50. Specifically, as shown in FIGS. 12, 13 and 14, the degree of inclination of the blade lower portion 28B toward the forward side in the rotational direction Drt becomes progressively smaller as the blade lower portion 28B extends away from the leading edge 23 of the blade 20.

Figure 11:
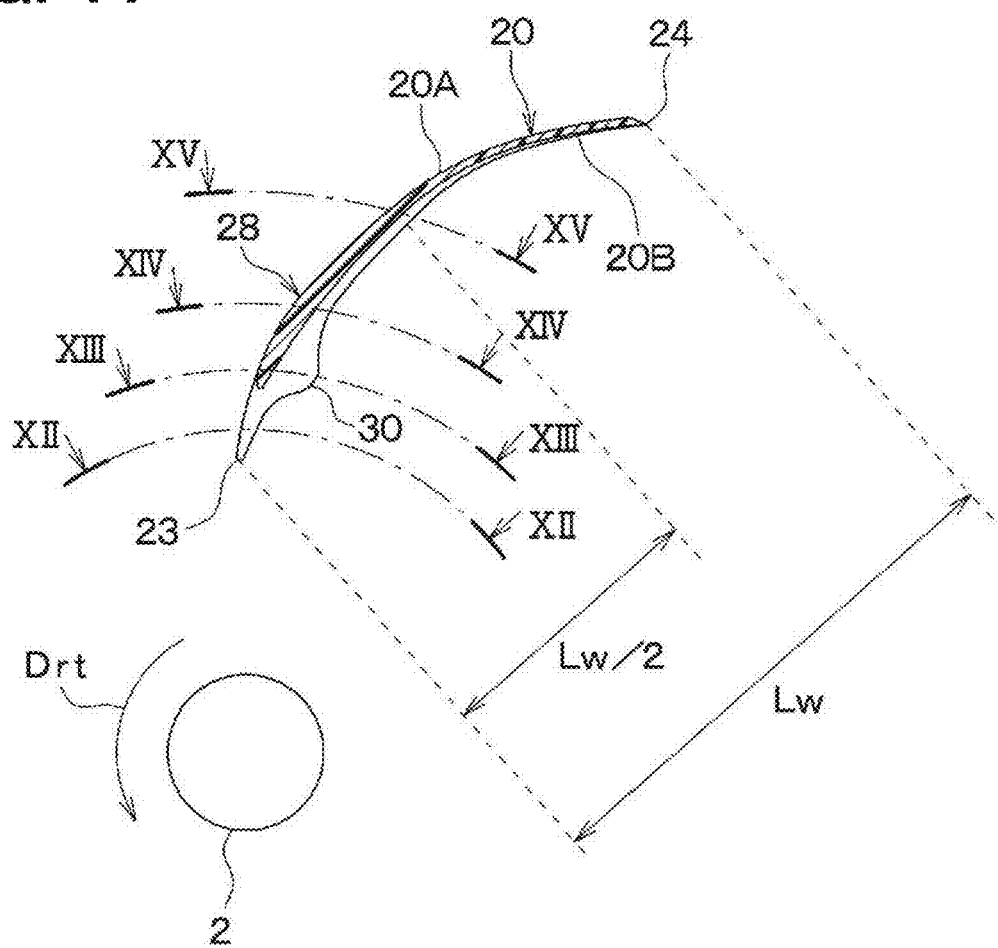
FIG. 11 is a schematic cross-sectional view of a representative blade of the centrifugal fan of the blower of the embodiment.
Figure 12:
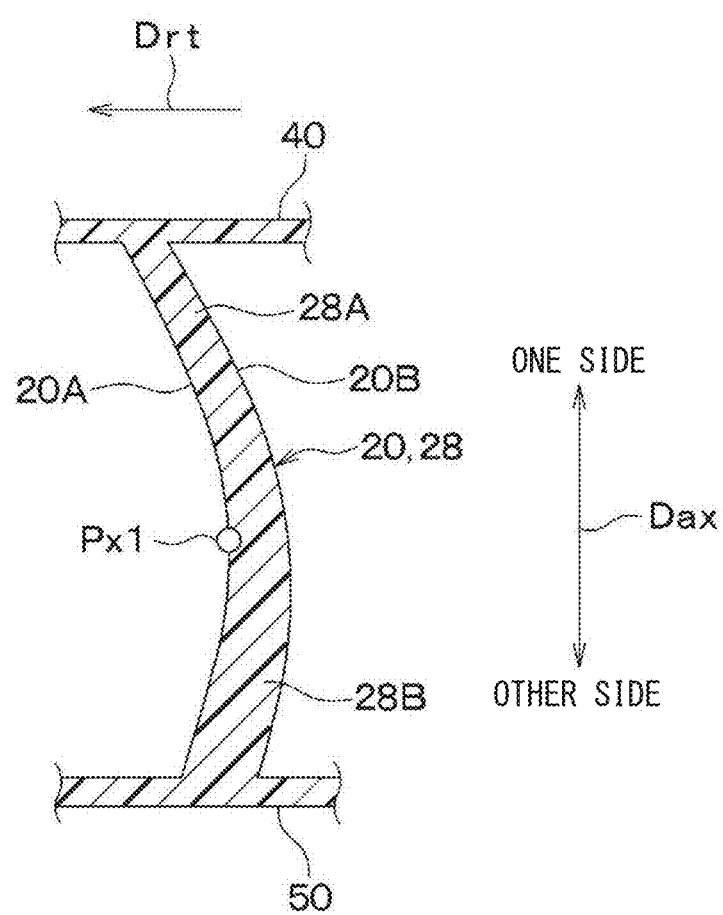
FIG. 12 is a cross-sectional view taken along line XII-XII in FIG. 11.
Figure 14:
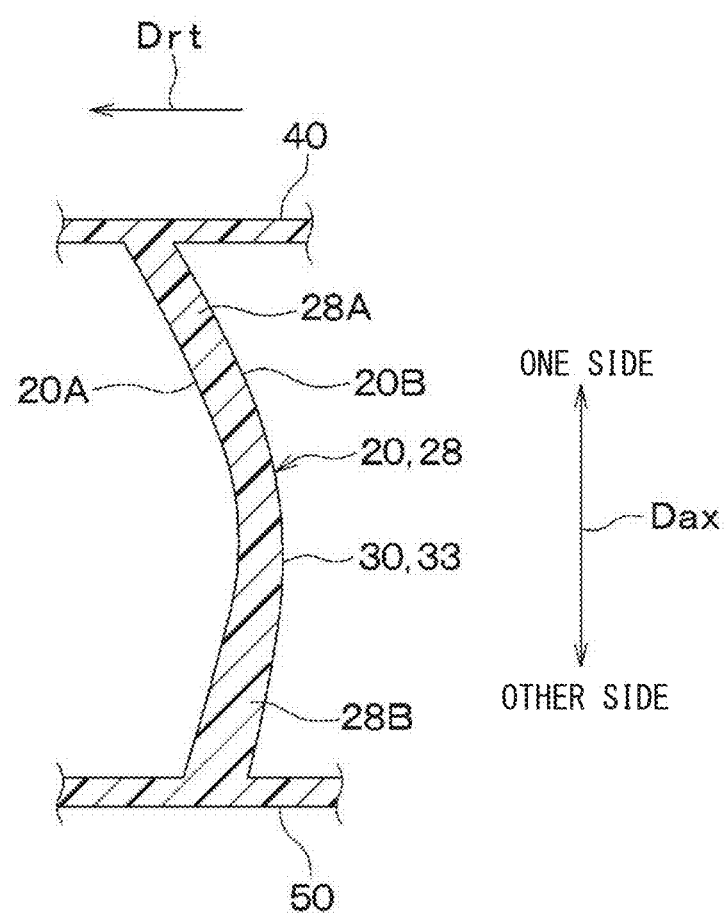
FIG. 14 is a cross-sectional view taken along line XIV-XIV in FIG. 11.
Figure 15:
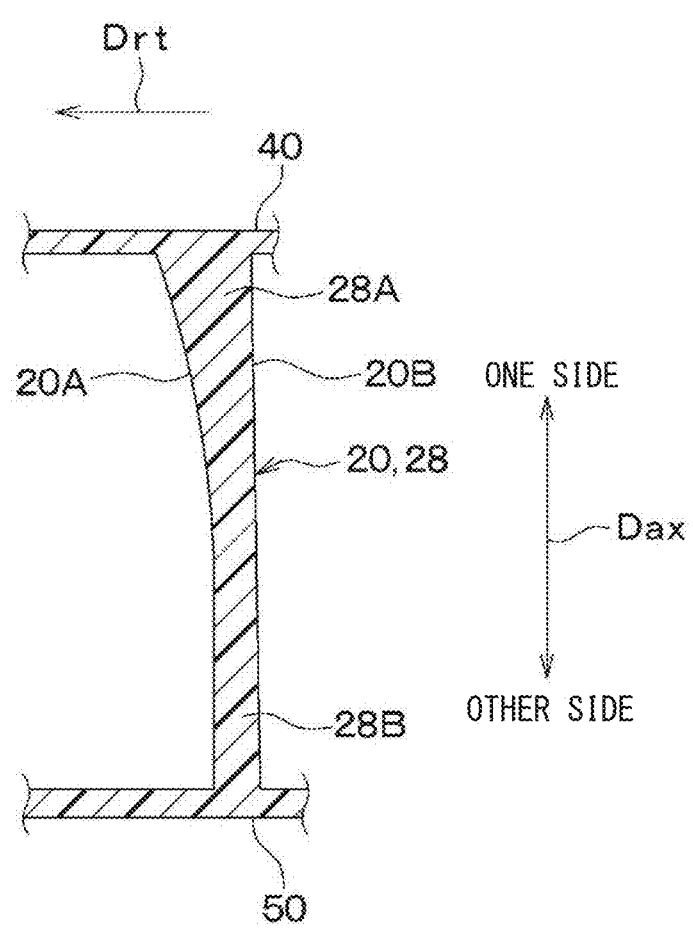
FIG. 15 is a cross-sectional view taken along line XV-XV in FIG. 11.

FIG. 12 is a cross-sectional view of the blade 20 at a location where the degree of inclination of the blade lower portion 28B toward the forward side in the rotational direction Drt becomes maximum (i.e., a maximum degree of inclination) along the blade 20. FIG. 13 is a cross-sectional view of the blade 20 at a location of the blade 20 at which the plate thickness of the blade 20 measured in the rotational direction Drt is maximized at the portion of the blade 20 having the projection 30 formed at the negative pressure surface 20B as shown in FIG. 11. FIG. 14 is a cross-sectional view of the blade 20 at a location which is closer to the leading edge 23 than the trailing edge 24 along the virtual flow lines IL. FIG. 15 is a cross-sectional view of the blade 20 at a location of a midpoint of a blade chord length Lw of the blade 20 measured along the second blade end part 22.

Here, at the portion of the blade 20 where the degree of inclination toward the forward side in the rotational direction Drt becomes maximum (i.e., the maximum degree of inclination) along the blade 20, an axial location (i.e., a location in the axial direction Dax) of a starting point of the inclination of the positive pressure surface 20A toward the forward side in the rotational direction Drt is defined as an inclination start location Px1. As shown in FIG. 12, the inclination start location Px1 is set generally at a midpoint between the shroud 40 and the main plate 50.

Figure 13:
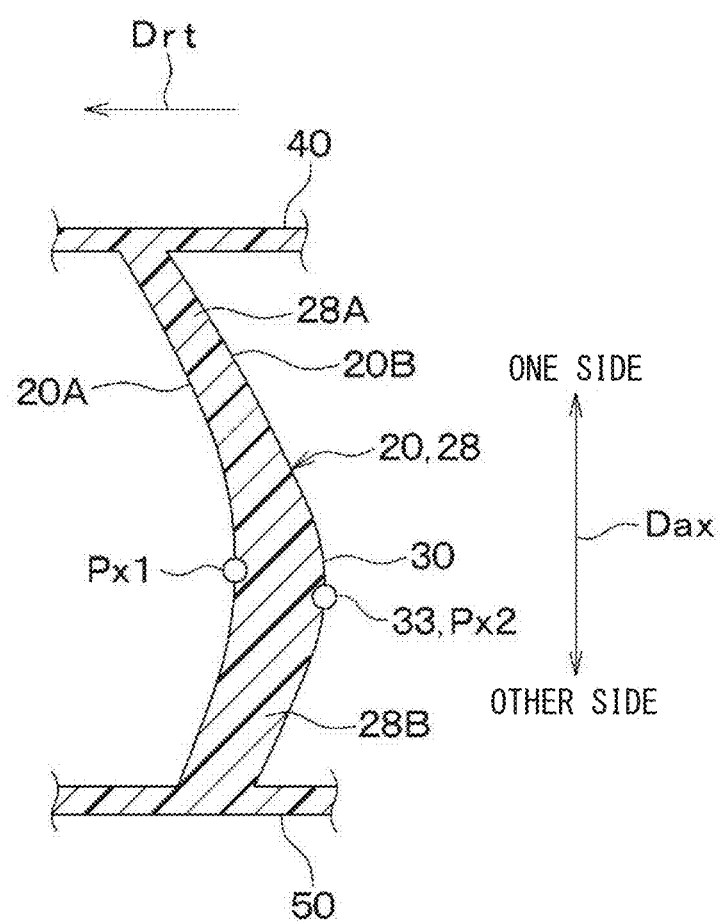
FIG. 13 is a cross-sectional view taken along line XIII-XIII in FIG. 11.

As shown in FIG. 13, at the location of the blade 20 at which the plate thickness of the blade 20 measured in the rotational direction Drt is maximized at the portion of the blade 20 having the projection 30 formed at the negative pressure surface 20B, a portion of the blade lower portion 28B at the positive pressure surface 20A of the blade 20 is inclined toward the forward side in the rotational direction Drt. Therefore, a location, at which the positive pressure surface 20A of the blade lower portion 28B stops being inclined toward the forward side in the rotational direction Drt, is further from the central axis CL than the location of the blade 20 at which the plate thickness of the blade 20 measured in the rotational direction Drt is maximized at the portion of the blade 20 having the projection 30 formed at the negative pressure surface 20B.

Now, the axial location (the location in the axial direction Dax) of the blade 20, at which the plate thickness of the blade 20 measured in the rotational direction Drt is maximized at the portion of the blade 20 having the projection 30 formed at the negative pressure surface 20B, is defined as a maximum plate thickness location Px2. In such a case, the maximum plate thickness location Px2 is set to be closer to the main plate 50 than the shroud 40. Specifically, the maximum plate thickness location Px2 is set to be closer to the main plate 50 than the inclination start location Px1.

As shown in FIG. 14, at the location which is closer to the leading edge 23 than the trailing edge 24 along the virtual flow lines IL, the portion of the blade lower portion 28B at the positive pressure surface 20A of the blade 20 is slightly included toward the forward side in the rotational direction Drt. Furthermore, as shown in FIG. 15, at the location of the midpoint of the blade chord length Lw of the blade 20, the blade lower portion 28B at the positive pressure surface 20A of the blade 20 is not inclined toward the forward side in the rotational direction Drt.

Therefore, the location, at which the positive pressure surface 20A of the blade lower portion 28B stops being inclined toward the forward side in the rotational direction Drt, is located close to, i.e., adjacent to the leading edge 23 along the virtual flow lines IL. Specifically, the location, at which the positive pressure surface 20A of the blade lower portion 28B stops being inclined toward the forward side in the rotational direction Drt, is closer to the leading edge 23 than the location of the midpoint of the blade chord length Lw measured at the second blade end part 22.

In the blower 1 of the present embodiment described above, when the energization of the electric motor 3 starts, the centrifugal fan 10 is rotated in the rotational direction Drt together with the shaft 2. At this time, the blades 20 of the centrifugal fan 10 provide the momentum to the air. Thereby, the centrifugal fan 10 suctions the air from the air suction hole 41 toward the inter-blade passages 29 and discharges the air from the inter-blade passages 29 toward the outside in the radial direction Drd of the centrifugal fan 10.

Figure 16:
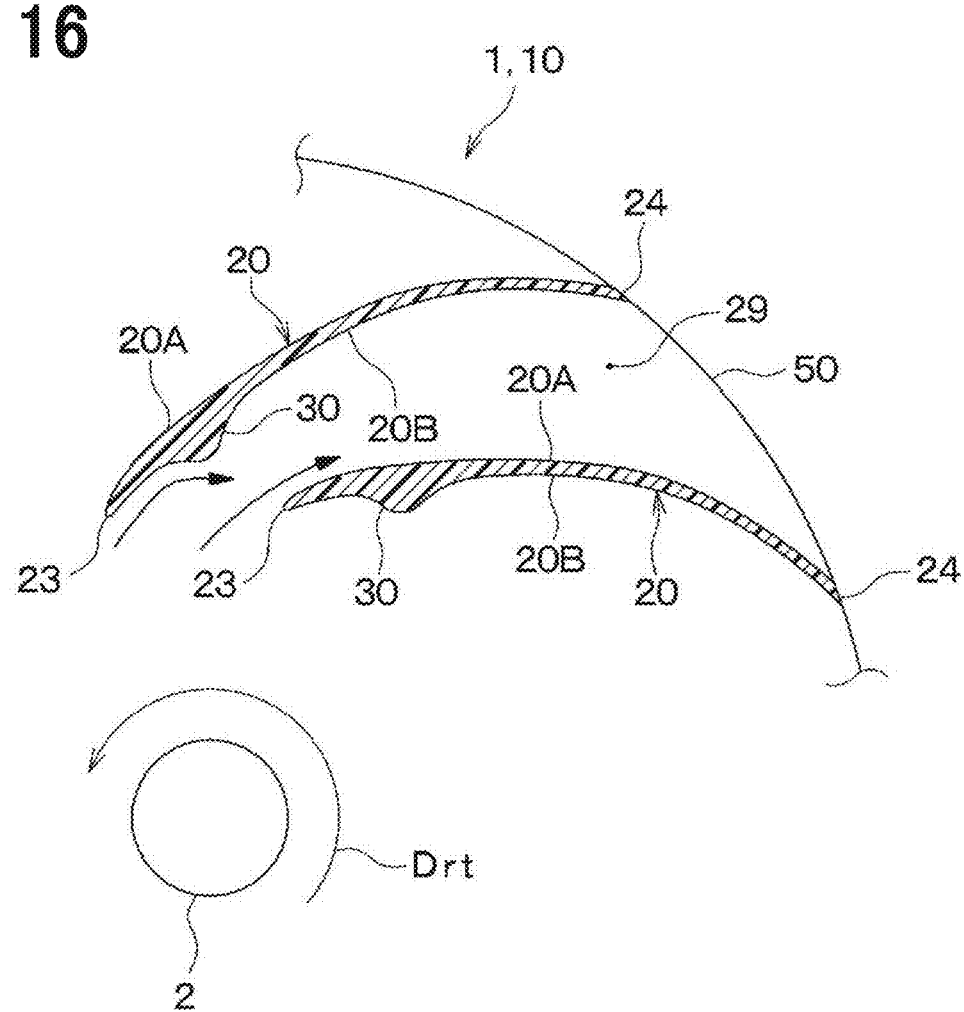
FIG. 16 is an explanatory diagram for explaining an airflow along the blades of the centrifugal fan of the blower of the embodiment.
Figure 17:
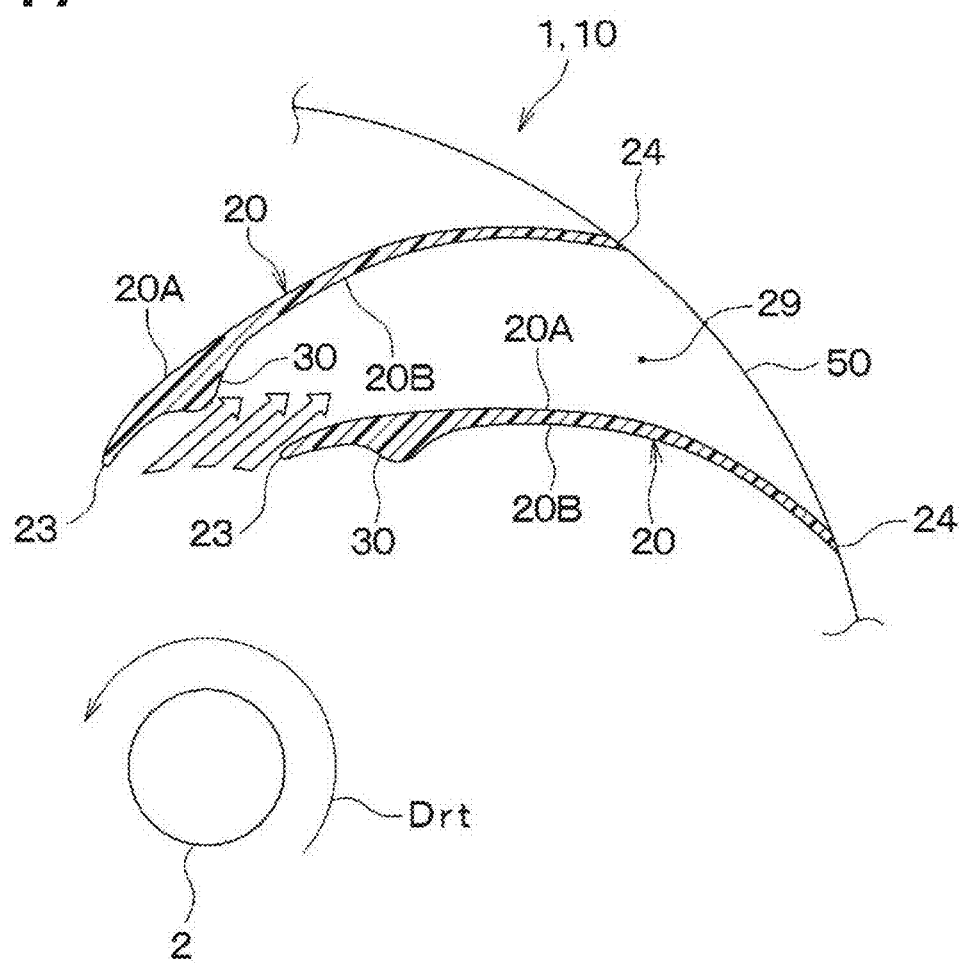
FIG. 17 is an explanatory diagram for explaining a flow velocity distribution around a leading edge of the centrifugal fan of the blower of the embodiment.

Each of the blades 20 of the present embodiment has the projection 30 which is formed at the negative pressure surface 20B of the air inlet section 28 and projects toward the positive pressure surface 20A of the adjacent blade 20. The projection 30 formed at the negative pressure surface 20B of the blade 20 exerts a force to a part of the airflow, which flows along the negative pressure surface 20B of the blade 20, in a direction away from the negative pressure surface 20B. Therefore, as shown in FIG. 16, the airflow is more easily directed toward the positive pressure surface 20A of the adjacent blade 20. As a result, as shown in FIG. 17, the flow velocity of the airflow at the negative pressure surface 20B side is reduced, and the flow velocity of the airflow at the positive pressure surface 20A side is increased. Thus, a difference between the flow velocity of the airflow at the negative pressure surface 20B side and the flow velocity of the airflow at the positive pressure surface 20A side is reduced.

Figure 18:
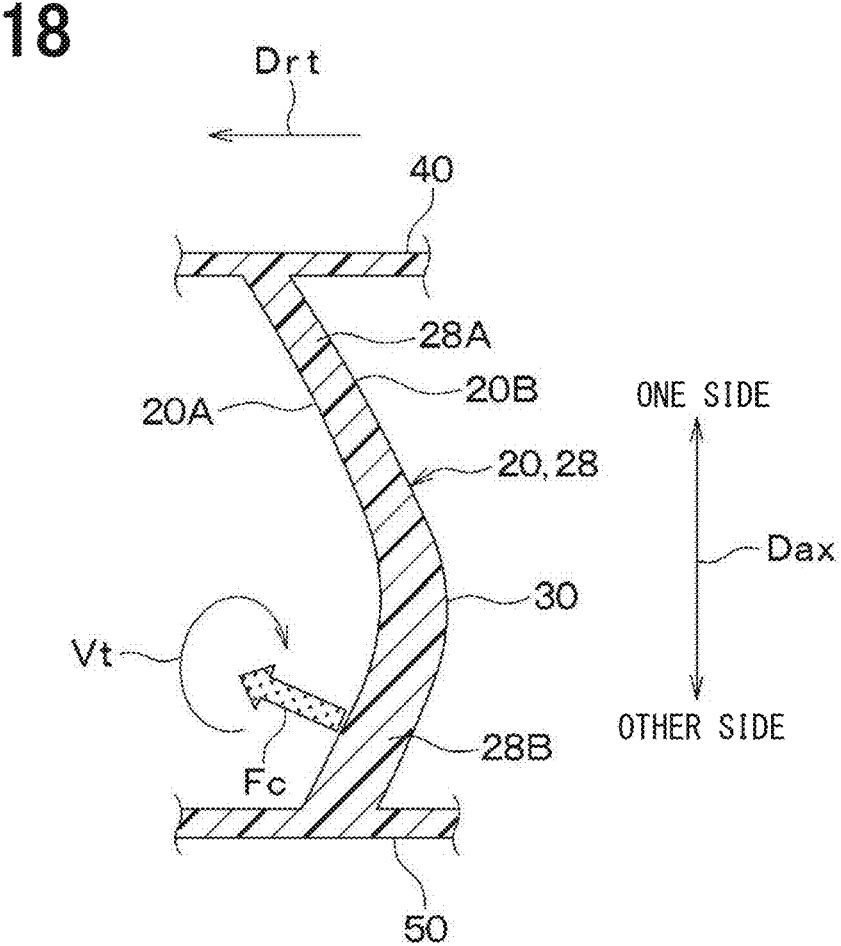
FIG. 18 is an explanatory diagram for explaining a limiting effect for limiting a vortex at a positive pressure surface of the blade.

When the flow velocity of the airflow at the positive pressure surface 20A side is increased, a vortex Vt is likely to be generated at the positive pressure surface 20A side. However, at the blade 20 of the present embodiment, the portion of the positive pressure surface 20A adjacent to the main plate 50 is inclined toward the forward side in the rotational direction Drt to progressively extend toward the forward side in the rotational direction Drt as the portion of the positive pressure surface 20A adjacent to the main plate 50 extends toward the main plate 50. Therefore, as shown in FIG. 18, a force Fc is likely to act in a direction for limiting generation or development of the vortex Vt at the positive pressure surface 20A side of the blade 20, and thereby it is possible to limit the disadvantages resulting from the vortex Vt at the positive pressure surface 20A side.

Figure 19:
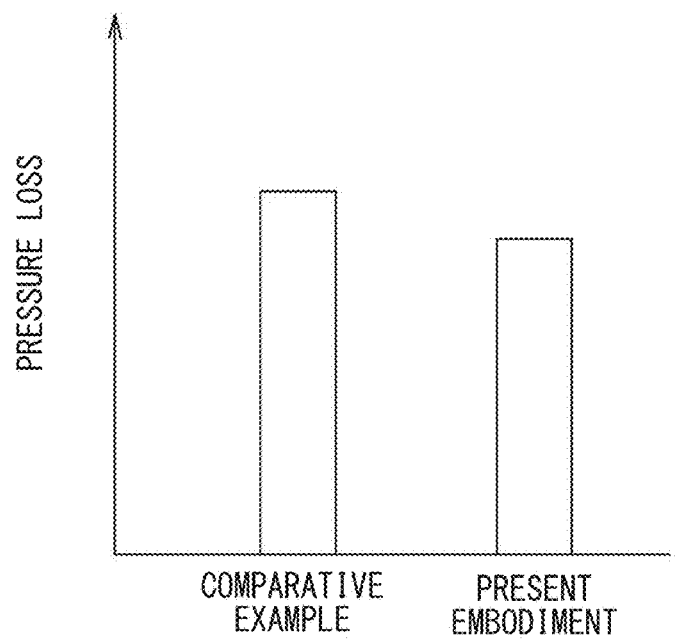
FIG. 19 is an explanatory diagram for explaining a reducing effect for reducing a pressure loss.

Therefore, the blower 1 of the present embodiment can limit the flow velocity distribution discussed above around the leading edge 23 of the blade 20 and limit the disadvantages resulting from the vortex Vt at the positive pressure surface 20A side caused by this flow velocity distribution. The disadvantages resulting from the vortex Vt at the positive pressure surface 20A side may be, for example, an increase in the pressure loss and an increase in the noise level. As shown in FIG. 19, the blower 1 of the present embodiment can more effectively limit the increase in the pressure loss in comparison to the blower CE of the comparative example shown in FIG. 4.

Furthermore, according to the present embodiment, the following advantages can be achieved.

(1) In the centrifugal fan 10, the vortex Vt is more easily generated at the main plate 50 side of the blade 20 than the shroud 40 side of the blade 20 because the flow velocity of the airflow at the main plate 50 side of the blade 20 becomes higher than the flow velocity of the airflow at the shroud 40 side of the blade 20. The separation of the airflow from the blade 20 is likely to be generated around the shroud 40 at the leading edge 23 of the blade 20.

In view of the above points, according to the present embodiment, the portion of the adjacent side region of the positive pressure surface 20A of the air inlet section 28, which is adjacent to the main plate 50, is inclined toward the forward side in the rotational direction Drt to progressively extend toward the forward side in the rotational direction Drt as the portion of the adjacent side region of the positive pressure surface 20A adjacent to the main plate 50 extends toward the main plate 50. Therefore, the force is likely to act in the direction for limiting the generation or the development of the vortex Vt at the positive pressure surface 20A side of the blade 20, and thereby it is possible to limit the disadvantages resulting from the vortex Vt at the positive pressure surface 20A side.

In addition, according to the present embodiment, the portion of the adjacent side region of the positive pressure surface 20A of the air inlet section 28, which is adjacent to the shroud 40, is inclined toward the forward side in the rotational direction Drt to progressively extend toward the forward side in the rotational direction Drt as the portion of the adjacent side region of the positive pressure surface 20A adjacent to the shroud 40 extends toward the shroud 40. With this configuration, the inflow angle of the airflow relative to the blade 20 around the shroud 40 can be reduced to limit the separation of the airflow near the shroud 40.

Therefore, the blower 1 of the present embodiment can limit the separation of the airflow near the shroud 40 while limiting the flow velocity distribution discussed above around the leading edge 23 of the blade 20.

(2) The flow velocity of the airflow at the main plate 50 side is higher than the flow velocity of the airflow at the shroud 40 side, and the noise level at the main plate 50 side is likely to become larger. Because of this, it is desirable to have the configuration that can limit the generation of the vortex Vt while reducing the degree of inclination at the air inlet section 28. In contrast, since the flow velocity of the airflow at the shroud 40 side is lower than the flow velocity of the airflow at the main plate 50 side, even when the degree of inclination at the air inlet section 28 is increased to obtain the limiting effect for limiting the airflow separation around the shroud 40, the noise level is unlikely to be an annoying level.

In view of the above points, the angle θm, which is defined between the main plate side reference line Lm and the plane PL extending parallel to the central axis CL, is made smaller than the angle θs, which is defined between the shroud side reference line Ls and the plane PL extending parallel to the central axis CL. Therefore, the blower 1, which can limit the flow velocity distribution discussed above around the leading edge 23 of the blade 20 and can limit the separation of the airflow near the shroud 40, can have the design that is suitable for limiting the generation of the noise.

(3) The flow velocity of the airflow at the positive pressure surface 20A of the blade 20 tends to be prominent at the portion of the positive pressure surface 20A of the blade 20, which is from the leading edge 23 to the location corresponding to the projection 30. In comparison to the trailing edge 24 side, the vortex Vt is more likely to be generated on the leading edge 23 side of the blade 20 and the portion of the negative pressure surface 20B having the projection 30.

In view of these points, it is desirable that the location, at which the positive pressure surface 20A of the blade lower portion 28B stops being inclined toward the forward side in the rotational direction Drt, is close to, i.e., adjacent to the leading edge 23 along the virtual flow lines IL. Specifically, it is desirable that the location, at which the positive pressure surface 20A of the blade lower portion 28B stops being inclined toward the forward side in the rotational direction Drt, is further from the central axis CL than the location of the maximum plate thickness of the blade 20 at which the plate thickness of the blade 20 measured in the rotational direction Drt is maximized at the portion of the blade 20 having the projection 30 formed at the negative pressure surface 20B. With this configuration, the disadvantages resulting from the vortex Vt at the positive pressure surface 20A of the blade 20 can be sufficiently limited while limiting the flow velocity distribution discussed above around the leading edge 23 of the blade 20.

(4) At the positive pressure surface 20A of the air inlet section 28, the portion of the blade lower portion 28B is inclined toward the forward side in the rotational direction Drt with the degree of inclination that is progressively reduced as the portion of the blade lower portion 28B extends away from the leading edge 23. Furthermore, the location, at which the positive pressure surface 20A of the blade lower portion 28B stops being inclined toward the forward side in the rotational direction Drt, is closer to the leading edge 23 along the virtual flow lines IL than the location of the midpoint of the blade chord length Lw measured at the second blade end part 22. With this configuration, the generation or the development of the vortex Vt at the positive pressure surface 20A of the blade 20 can be limited.

(5) Here, the vortex Vt tends to be generated around the portion of the positive pressure surface 20A, which corresponds to the location of the projection 30. Therefore, it is desirable that the maximum plate thickness location Px2 is set to be closer to the main plate 50 than the inclination start location Px1. With this configuration, the disadvantages resulting from the vortex Vt at the positive pressure surface 20A side of the blade 20 can be sufficiently limited.

(6) Furthermore, the difference between the flow velocity of the airflow at the negative pressure surface 20B side of the blade 20 and the flow velocity of the airflow at the positive pressure surface 20A side of the adjacent blade 20 is more likely to be increased at the main plate 50 side rather than at the shroud 40 side. Therefore, it is desirable that the maximum plate thickness location Px2 is closer to the main plate 50 than the intermediate virtual flow line IL5. With this configuration, the difference between the flow velocity of the airflow at the negative pressure surface 20B side of the blade 20 and the flow velocity of the airflow at the positive pressure surface 20A side of the adjacent blade 20 can be sufficiently limited.

OTHER EMBODIMENTS

Although the representative embodiment of the present disclosure has been described above, the present disclosure is not limited to the above-described embodiment and can be variously modified, for example, as follows.

In the centrifugal fan 10 of the embodiment described above, the adjacent side region of the positive pressure surface 20A of the air inlet section 28, which is adjacent to the main plate 50, is substantially entirely inclined toward the forward side in the rotational direction Drt to progressively extend toward the forward side in the rotational direction Drt as the adjacent side region of the positive pressure surface 20A of the air inlet section 28 adjacent to the main plate 50 extends toward the main plate 50. At the centrifugal fan 10, for example, a part of the adjacent side region of the positive pressure surface 20A of the air inlet section 28, which is adjacent to the main plate 50, may not be tilted toward the forward side in the rotational direction Drt.

At the centrifugal fan 10, although it is desirable that the adjacent side region of the positive pressure surface 20A of the air inlet section 28, which is adjacent to the shroud 40, is inclined toward the forward side in the rotational direction Drt to progressively extend toward the forward side in the rotational direction Drt as the adjacent side region of the positive pressure surface 20A of the air inlet section 28 adjacent to the shroud 40 extends toward the shroud 40, the present disclosure is not limited to this configuration. At the centrifugal fan 10, for example, the adjacent side region of the positive pressure surface 20A of the air inlet section 28, which is adjacent to the shroud 40, may not be tilted toward the forward side in the rotational direction Drt.

Although it is desirable that the angle θm, which is defined between the main plate side reference line Lm and the plane PL extending parallel to the central axis CL, is made smaller than the angle θs, which is defined between the shroud side reference line Ls and the plane PL extending parallel to the central axis CL, the present disclosure is not limited to this relationship. Each of the blades 20 may be configured such that the angle θm, which is defined between the main plate side reference line Lm and the plane PL extending parallel to the central axis CL, is equal to or larger than the angle θs, which is defined between the shroud side reference line Ls and the plane PL extending parallel to the central axis CL.

Although it is desirable that the location, at which the positive pressure surface 20A of the blade lower portion 28B stops being inclined toward the forward side in the rotational direction Drt, is close to, i.e., adjacent to the leading edge 23 along the virtual flow lines IL, the location, at which the positive pressure surface 20A of the blade lower portion 28B stops being inclined toward the forward side in the rotational direction Drt, may be different from this location.

Although it is desirable that the location, at which the positive pressure surface 20A of the blade lower portion 28B stops being inclined toward the forward side in the rotational direction Drt, is closer to the leading edge 23 along the virtual flow lines IL than the location of the midpoint of the blade chord length Lw measured along the second blade end part 22, the location, at which the positive pressure surface 20A of the blade lower portion 28B stops being inclined toward the forward side in the rotational direction Drt, may be different from this location.

Furthermore, although it is desirable that the maximum plate thickness location Px2 is closer to the main plate 50 than the inclination start location Px1, the present disclosure is not limited to this relationship. The maximum plate thickness location Px2 may be set to be closer to the shroud 40 than the inclination start location Px1. Furthermore, the maximum plate thickness location Px2 may not be set to be closer to the main plate 50 than the intermediate virtual flow line IL5.

In the embodiment described above, there is described the example where the centrifugal fan 10 is formed as the turbofan. However, the centrifugal fan 10 of the present disclosure is not limited to this. The centrifugal fan 10 may be a sirocco fan or a radial fan. Furthermore, the centrifugal fan 10 may be a diagonal flow fan.

In the embodiment described above, there is described the example, in which the blower 1 of the present disclosure is applied to the air conditioning device in the room. However, the blower 1 of the present disclosure may be applied to devices other than the air conditioning device in the room.

Needless to say, in the above-described embodiments, the components of the embodiment(s) are not necessarily essential except when it is clearly indicated that they are essential and when they are clearly considered to be essential in principle.

In the above-described embodiments, when the numerical values, such as the number, numerical value, quantity, range, etc. of the components of the embodiment(s) are mentioned, the numerical values are not limited to those described in the embodiment(s) except when it is clearly indicated that the numerical values are essential and when the numerical values are clearly considered to be essential in principle.

In the above-described embodiments, when a shape, a positional relationship, etc. of the component(s) is mentioned, the shape, positional relationship, etc. are not limited to those described in the embodiment(s) unless otherwise specified or limited in principle to the those described in the embodiment(s).

The present disclosure includes the following aspects.

First Aspect

According to a first aspect of the present disclosure, there is provided a blower including:
a shaft; and
a centrifugal fan which is coupled to the shaft, wherein:
the centrifugal fan includes:
  a plurality of blades which are arranged around a central axis of the shaft;
  a shroud which is coupled to a first blade end part of each of the plurality of blades that faces one side in an axial direction of the shaft, wherein the shroud has an air suction hole that is configured to suction air; and
  a main plate which is coupled to a second blade end part of each of the plurality of blades that faces another side opposite to the one side in the axial direction;
each of the plurality of blades has a leading edge, which forms an inner periphery of the blade, and a trailing edge, which forms an outer periphery of the blade;
at each of the plurality of blades, a plurality of dividing points, which are sequentially numbered from one of the first blade end part and the second blade end part, are set along the leading edge to divide the leading edge by a predetermined number and thereby form a plurality of segments which have equal lengths, respectively, along the leading edge; a plurality of dividing points, which are sequentially numbered from the one of the first blade end part and the second blade end part, are set along the trailing edge to divide the trailing edge by the predetermined number and thereby form a plurality of segments which have equal lengths, respectively, along the trailing edge; at least one intermediate part is positioned to uniformly divide the blade between the leading edge and the trailing edge into a plurality of sections; a plurality of dividing points, which are sequentially numbered from the one of the first blade end part and the second blade end part, are set along the at least one intermediate part to divide the at least one intermediate part by the predetermined number and thereby form a plurality of segments which have equal lengths, respectively, along the at least one intermediate part; a plurality of virtual flow lines are set such that each of the plurality of virtual flow lines connects a corresponding one of the plurality of dividing points along the leading edge, a corresponding one of the plurality of dividing points along the trailing edge and a corresponding one of the plurality of dividing points along the at least one intermediate part which are identically numbered;
at each of the plurality of blades each having a positive pressure surface and a negative pressure surface, the negative pressure surface of an air inlet section of the blade, which is closer to the leading edge than the trailing edge along the plurality of virtual flow lines, has a projection that projects toward the positive pressure surface of an adjacent one of the plurality of blades; and at each of the plurality of blades, at least a portion of the positive pressure surface of the air inlet section is inclined toward a forward side in a rotational direction of the centrifugal fan to progressively extend toward the forward side in the rotational direction as the portion of the positive pressure surface of the air inlet section extends toward the main plate.

Second Aspect

According to a second aspect of the present disclosure, there is provided the blower according to the first aspect, wherein at each of the plurality of blades, at least a portion of an adjacent side region of the positive pressure surface of the air inlet section, which is adjacent to the main plate, is inclined toward the forward side in the rotational direction to progressively extend toward the forward side in the rotational direction as the portion of the adjacent side region of the positive pressure surface of the air inlet section adjacent to the main plate extends toward the main plate, and at least a portion of an adjacent side region of the positive pressure surface of the air inlet section, which is adjacent to the shroud, is inclined toward the forward side in the rotational direction to progressively extend toward the forward side in the rotational direction as the portion of the adjacent side region of the positive pressure surface of the air inlet section adjacent to the shroud extends toward the shroud.

Third Aspect

According to a third aspect of the present disclosure, there is provided the blower according to the second aspect, wherein:
- at each of the plurality of blades, a line, which connects between a most forward point located most forward in the rotational direction and a most rearward point located most rearward in the rotational direction at the adjacent side region of the positive pressure surface of the air inlet section adjacent to the main plate, is defined as a main plate side reference line, and a line, which connects between a most forward point located most forward in the rotational direction and a most rearward point located most rearward in the rotational direction at the adjacent side region of the positive pressure surface of the air inlet section adjacent to the shroud, is defined as a shroud side reference line; and
- an angle, which is defined between the main plate side reference line and a plane extending parallel to the central axis, is smaller than an angle, which is defined between the shroud side reference line and the plane extending parallel to the central axis.

Fourth Aspect

According to a fourth aspect of the present disclosure, there is provided the blower according to any one of the first to third aspects, wherein:
- at each of the plurality of blades, at least a portion of an adjacent side region of the positive pressure surface of the air inlet section, which is adjacent to the main plate, is inclined toward the forward side in the rotational direction with a degree of inclination that is progressively reduced as the portion of the adjacent side region of the positive pressure surface of the air inlet section adjacent to the main plate extends away from the main plate; and
- at each of the plurality of blades, a location, at which the adjacent side region of the positive pressure surface adjacent to the main plate stops being inclined toward the forward side in the rotational direction, is adjacent to the leading edge along the plurality of virtual flow lines and is further from the central axis than a location of the blade at which a plate thickness of the blade measured in the rotational direction is maximized at a portion of the blade having the projection formed at the negative pressure surface.

Fifth Aspect

According to a fifth aspect of the present disclosure, there is provided the blower according to the fourth aspect, wherein:
- at each of the plurality of blades, at least the portion of the adjacent side region of the positive pressure surface of the air inlet section, which is adjacent to the main plate, is inclined toward the forward side in the rotational direction with the degree of inclination that is progressively reduced as the portion of the adjacent side region of the positive pressure surface of the air inlet section adjacent to the main plate extends away from the leading edge; and
- at each of the plurality of blades, the location, at which the adjacent side region of the positive pressure surface adjacent to the main plate stops being inclined toward the forward side in the rotational direction, is closer to the leading edge than a location of a midpoint of a blade chord length of the blade measured along the second blade end part.

Sixth Aspect

According to a sixth aspect of the present disclosure, there is provided the blower according to any one of the first to fifth aspects, wherein:
- at each of the plurality of blades, a degree of inclination of the positive pressure surface of the air inlet section toward the forward side in the rotational direction is progressively reduced as the positive pressure surface of the air inlet section extends away from the leading edge; and
- at each of the plurality of blades, an axial location, at which a plate thickness of the blade measured in the rotational direction is maximized at a portion of the blade having the projection formed at the negative pressure surface, is closer to the main plate in the axial direction than an axial location of a starting point of inclination of the positive pressure surface toward the forward side in the rotational direction at an adjacent side region of the positive pressure surface, which is adjacent to the main plate and has a maximum degree of inclination toward the forward side in the rotational direction along the blade.

Seventh Aspect

According to a seventh aspect of the present disclosure, there is provided the blower according to the sixth aspect, wherein:

at each of the plurality of blades, a virtual line, which is equidistant from each of two opposite outermost virtual flow lines among the plurality of virtual flow lines opposite to each other in the axial direction, is defined as an intermediate virtual flow line; and at each of the plurality of blades, the axial location, at which the plate thickness of the blade measured in the rotational direction is maximized at the portion of the blade having the projection formed at the negative pressure surface, is closer to the main plate than the intermediate virtual flow line.

What is claimed is:

1. A blower comprising:

a shaft; and a centrifugal fan which is coupled to the shaft, wherein:

the centrifugal fan includes:
- a plurality of blades which are arranged around a central axis of the shaft;
- a shroud which is coupled to a first blade end part of each of the plurality of blades that faces one side in an axial direction of the shaft, wherein the shroud has an air suction hole that is configured to suction air; and
- a main plate which is coupled to a second blade end part of each of the plurality of blades that faces another side opposite to the one side in the axial direction;

each of the plurality of blades has a leading edge, which forms an inner periphery of the blade, and a trailing edge, which forms an outer periphery of the blade;

at each of the plurality of blades, a plurality of dividing points, which are sequentially numbered from one of the first blade end part and the second blade end part, are set along the leading edge to divide the leading edge by a predetermined number and thereby form a plurality of segments which have equal lengths, respectively, along the leading edge; a plurality of dividing points, which are sequentially numbered from the one of the first blade end part and the second blade end part, are set along the trailing edge to divide the trailing edge by the predetermined number and thereby form a plurality of segments which have equal lengths, respectively, along the trailing edge; at least one intermediate part is positioned to uniformly divide the blade between the leading edge and the trailing edge into a plurality of sections; a plurality of dividing points, which are sequentially numbered from the one of the first blade end part and the second blade end part, are set along the at least one intermediate part to divide the at least one intermediate part by the predetermined number and thereby form a plurality of segments which have equal lengths, respectively, along the at least one intermediate part; and a plurality of virtual flow lines are set such that each of the plurality of virtual flow lines connects a corresponding one of the plurality of dividing points along the leading edge, a corresponding one of the plurality of dividing points along the trailing edge and a corresponding one of the plurality of dividing points along the at least one intermediate part which are identically numbered;

at each of the plurality of blades each having a positive pressure surface and a negative pressure surface, the negative pressure surface of an air inlet section of the blade, which is closer to the leading edge than the trailing edge along the plurality of virtual flow lines, has a projection that projects toward the positive pressure surface of an adjacent one of the plurality of blades;

at each of the plurality of blades, at least a portion of the positive pressure surface of the air inlet section is inclined toward a forward side in a rotational direction of the centrifugal fan to progressively extend toward the forward side in the rotational direction as the portion of the positive pressure surface of the air inlet section extends toward the main plate; and in the negative pressure surface, a concavely curved surface is formed at a connection between a location of the projection and an upstream location, which is on an upstream side of the location of the projection in a flow direction of the air along the negative pressure surface, so as to continuously and smoothly connect between the location of the projection and the upstream location and guide a flow of the air in a direction away from the negative pressure surface.

2. The blower according to claim 1, wherein at each of the plurality of blades, at least a portion of an adjacent side region of the positive pressure surface of the air inlet section, which is adjacent to the main plate, is inclined toward the forward side in the rotational direction to progressively extend toward the forward side in the rotational direction as the portion of the adjacent side region of the positive pressure surface of the air inlet section adjacent to the main plate extends toward the main plate, and at least a portion of an adjacent side region of the positive pressure surface of the air inlet section, which is adjacent to the shroud, is inclined toward the forward side in the rotational direction to progressively extend toward the forward side in the rotational direction as the portion of the adjacent side region of the positive pressure surface of the air inlet section adjacent to the shroud extends toward the shroud.

3. The blower according to claim 2, wherein:

at each of the plurality of blades, a line, which connects between a most forward point located most forward in the rotational direction and a most rearward point located most rearward in the rotational direction at the adjacent side region of the positive pressure surface of the air inlet section adjacent to the main plate, is defined as a main plate side reference line, and a line, which connects between a most forward point located most forward in the rotational direction and a most rearward point located most rearward in the rotational direction at the adjacent side region of the positive pressure surface of the air inlet section adjacent to the shroud, is defined as a shroud side reference line; and an angle, which is defined between the main plate side reference line and a plane extending parallel to the central axis, is smaller than an angle, which is defined between the shroud side reference line and the plane extending parallel to the central axis.

4. The blower according to claim 1, wherein:

at each of the plurality of blades, at least a portion of an adjacent side region of the positive pressure surface of the air inlet section, which is adjacent to the main plate, is inclined toward the forward side in the rotational direction with a degree of inclination that is progressively reduced as the portion of the adjacent side region of the positive pressure surface of the air inlet section adjacent to the main plate extends away from the main plate; and at each of the plurality of blades, a location, at which the adjacent side region of the positive pressure surface adjacent to the main plate stops being inclined toward the forward side in the rotational direction, is adjacent to the leading edge along the plurality of virtual flow lines and is further from the central axis than a location of the blade at which a plate thickness of the blade measured in the rotational direction is maximized at a portion of the blade having the projection formed at the negative pressure surface.

5. The blower according to claim 4, wherein:

at each of the plurality of blades, at least the portion of the adjacent side region of the positive pressure surface of the air inlet section, which is adjacent to the main plate, is inclined toward the forward side in the rotational direction with the degree of inclination that is progressively reduced as the portion of the adjacent side region of the positive pressure surface of the air inlet section adjacent to the main plate extends away from the leading edge; and at each of the plurality of blades, the location, at which the adjacent side region of the positive pressure surface adjacent to the main plate stops being inclined toward the forward side in the rotational direction, is closer to the leading edge than a location of a midpoint of a blade chord length of the blade measured along the second blade end part.

6. The blower according to claim 1, wherein:

at each of the plurality of blades, a degree of inclination of the positive pressure surface of the air inlet section toward the forward side in the rotational direction is progressively reduced as the positive pressure surface of the air inlet section extends away from the leading edge; and at each of the plurality of blades, an axial location, at which a plate thickness of the blade measured in the rotational direction is maximized at a portion of the blade having the projection formed at the negative pressure surface, is closer to the main plate in the axial direction than an axial location of a starting point of inclination of the positive pressure surface toward the forward side in the rotational direction at an adjacent side region of the positive pressure surface, which is adjacent to the main plate and has a maximum degree of inclination toward the forward side in the rotational direction along the blade.

7. The blower according to claim 6, wherein:

at each of the plurality of blades, a virtual line, which is equidistant from each of two opposite outermost virtual flow lines among the plurality of virtual flow lines opposite to each other in the axial direction, is defined as an intermediate virtual flow line; and at each of the plurality of blades, the axial location, at which the plate thickness of the blade measured in the rotational direction is maximized at the portion of the blade having the projection formed at the negative pressure surface, is closer to the main plate than the intermediate virtual flow line.

* * * * *